United States Patent
Shea et al.

(10) Patent No.: US 6,657,150 B1
(45) Date of Patent: Dec. 2, 2003

(54) SHORTING SWITCH AND SYSTEM TO ELIMINATE ARCING FAULTS IN POWER DISTRIBUTION EQUIPMENT

(75) Inventors: John J. Shea, Pittsburgh, PA (US); Jeffrey A. Miller, Coraopolis, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/172,651

(22) Filed: Jun. 14, 2002

(51) Int. Cl.$^7$ ................................................. H01H 3/00
(52) U.S. Cl. ......................... 218/154; 218/43; 361/111
(58) Field of Search ............................... 218/7, 14, 78, 218/84, 154; 361/56, 111, 112, 42, 43; 200/300, 61.08

(56) References Cited

U.S. PATENT DOCUMENTS

| | | | |
|---|---|---|---|
| 4,339,638 A | * | 7/1982 | Lascelles et al. .......... 200/52 R |
| 4,433,607 A | * | 2/1984 | Kemeny .......................... 89/8 |
| 5,510,946 A | | 4/1996 | Franklin |
| 5,852,266 A | * | 12/1998 | Komuro et al. ............. 218/119 |
| 5,903,427 A | | 5/1999 | Roby |
| 5,933,308 A | | 8/1999 | Garzon |
| 5,940,547 A | | 8/1999 | Schumacher et al. |
| 6,084,756 A | * | 7/2000 | Doring et al. ................. 361/45 |
| 6,140,715 A | | 10/2000 | Bernhoff et al. |
| 6,141,192 A | | 10/2000 | Garzon |
| 6,229,680 B1 | | 5/2001 | Shea |
| 6,239,514 B1 | | 5/2001 | Isberg et al. |
| 6,506,990 B2 | * | 1/2003 | Marin-Pache et al. ...... 200/400 |
| 6,535,369 B1 | * | 3/2003 | Redding et al. ............ 361/111 |

OTHER PUBLICATIONS

Klockner–Moeller Ltd., "ARCON, Arc Fault Detection and Quenching System", 6 pgs.

UTU, "UTU Arc Protection Systems—a possibility to be protected", 4 pgs., Ulvila, Finland.

Garzon, R., "Arc Terminator An Alternative to Arc–Proofing", pp. 1–5, Square "D" Company, Smyrna, TN.

Square D Schneider Electric, "Arc–Terminator—Medium voltage arc–detection and arc–temination device", Power 2000, 9 pgs.

ABB Power Distribution, "ArcEliminator Rapid Elimination of Internal Arcing", 4 pgs., Arboga, Sweden.

Siemens, "Pressure Switch System 8AX10 For Medium Voltage Switchgear", 1 pg.

Berger, F. et al., "KurzschlieBer mit Gasgneeratorantrieb fur Storlichtbogenschutz", 4 pgs., Mar. 1999, Federal Republic of Germany.

RISI, "EBW Cable Cutter", 1 pg., San Ramon, CA.

RISI, "Technical Discussion on Explosives", 13 pgs.

* cited by examiner

Primary Examiner—Elvin Enad
Assistant Examiner—M. Fishman
(74) Attorney, Agent, or Firm—Martin J. Moran

(57) ABSTRACT

A shorting switch includes a vacuum switch having fixed and movable contact assemblies and a driven member. A spring cover tube and bushing mount the driven member for linear movement along a path substantially parallel to a longitudinal axis of the movable contact assembly. The driven member moves the movable contact assembly between open and closed circuit positions. A compression spring has a compressed state and a released state, which moves the driven member and movable contact assembly to the closed circuit position. A release bolt has an opening therein and is coupled to the driven member to normally maintain the compression spring in the compressed state. A charge is disposed in the opening of the release bolt and is actuated to fracture the release bolt and release the compression spring to the released state. First and second terminals are respectively electrically interconnected with the fixed and movable contact assemblies.

30 Claims, 15 Drawing Sheets

SHORTING SWITCH AND SYSTEM TO ELIMINATE ARCING FAULTS IN POWER DISTRIBUTION EQUIPMENT

CROSS-REFERENCE TO RELATED APPLICATIONS

This application is related to commonly assigned, concurrently filed:

U.S. patent application Ser. No. 10/172,208, filed Jun. 14, 2002, entitled "Shorting Switch And System To Eliminate Arcing Faults In Power Distribution Equipment;

U.S. patent application Ser. No. 10/172,826, filed Jun. 14, 2002, entitled "Shorting Switch And System To Eliminate Arcing Faults In Power Distribution Equipment";

U.S. patent application Ser. No. 10/172,238, filed Jun. 14, 2002, entitled "Shorting Switch And System To Eliminate Arcing Faults In Power Distribution Equipment";

U.S. patent application Ser. No. 10/172,622, filed Jun. 14, 2002, entitled "Bullet Assembly For A Vacuum Arc Interrupter";

U.S. patent application Ser. No. 10/172,080, filed Jun. 14, 2002, entitled "Vacuum Arc Interrupter Having A Tapered Conducting Bullet Assembly";

U.S. patent application Ser. No. 10/172,209, filed Jun. 14, 2002, entitled "Vacuum Arc Interrupter Actuated By A Gas Generated Driving Force";

U.S. patent application Ser. No. 10/172,628, filed Jun. 14, 2002, entitled "Blade Tip For Puncturing Cupro-Nickel Seal Cup"; and U.S. patent application Ser. No. 10/172,281, filed Jun. 14, 2002, entitled "Vacuum Arc Eliminator Having A Bullet Assembly Actuated By A Gas Generating Device".

BACKGROUND OF THE INVENTION

1. Field of the Invention

The invention is directed to shorting switches and, in particular, to shorting switches for eliminating arcing faults in low voltage power distribution equipment. The invention is also directed to shorting systems for eliminating arcing faults in power distribution equipment.

2. Background Information

There is the potential for an arcing fault to occur across the power bus of a motor control center (MCC), another medium voltage (MV) enclosure (e.g., a MV circuit breaker panel) and other industrial enclosures containing MV power distribution components. This is especially true when maintenance is performed on or about live power circuits. Frequently, a worker inadvertently shorts out the power bus, thereby creating an arcing fault inside the enclosure. The resulting arc blast creates an extreme hazard and could cause injury or even death. This problem is exacerbated by the fact that the enclosure doors are typically open for maintenance.

A high-speed shorting switch is needed for medium voltage as an alternative to arc proofing switchgear enclosures. Presently, manufacturers are developing more robust enclosures, which contain and direct the hot gases and flames out the top of the enclosure upon the occurrence of an internal arcing fault (e.g., a short across the bus bar, breaker, cable phase-to-phase or phase-to-ground). These faults can occur from a wide variety of sources, such as, for example, animals that crawl into the enclosure, tools left behind from maintenance crews, insulation failure, earthquakes, and other mechanical damage.

Rather than trying to contain and direct the blast, a new idea has been developed by others for eliminating the arcing fault altogether. This is done by shorting out the high-voltage bus either phase-to-phase or phase-to-ground. Known shorting switches use closing and holding techniques which are very expensive to buy and to maintain.

It is known to employ a high-speed shorting switch, placed between the power bus and ground, or from phase-to-phase, in order to limit or prevent equipment damage and personnel injury due to arc blasts. Such switches, which are large and costly, are located on the main power bus to shut down the entire power bus system when a fault occurs even if the fault is only on the load side of a branch circuit.

It is also known to employ various types of crowbar switches for this purpose. The switches short the line voltage on the power bus, eliminating the arc and preventing damage. The resulting short on the power bus causes an upstream circuit breaker to clear the fault.

Examples of medium voltage devices include a stored energy mechanism with vacuum interrupter contacts, and a mechanism to crush a conductor magnetically.

An example of a low voltage device is a stored energy air bag actuator, which drives a conductive member having a pin and a flange, in order to short two contacts. The first contact is in the form of a receptor for capturing the pin of the driven conductive member. The second contact has an opening, which allows the pin to pass therethrough, but which captures the flange of the driven member.

There is room for improvement in shorting switches and systems that respond to arcing faults and switch fast enough in order to protect workers and equipment from arc blasts associated with power distribution equipment.

SUMMARY OF THE INVENTION

These needs and others are met by the present invention, which provides a shorting switch and system for eliminating arcing faults in power distribution equipment. The shorting switch includes a vacuum switch having fixed and movable contact assemblies, a driven member, and a mount mounting the driven member for linear movement along a path substantially parallel to a longitudinal axis of the movable contact assembly. The driven member is coupled to the movable contact assembly to move the movable contact assembly between open and closed circuit positions with the linear movement of the driven member. A spring member has a compressed state and a released state, which moves the driven member and the movable contact assembly to the closed circuit position. A release mechanism holds and releases the driven member and the spring member. First and second terminals are respectively electrically interconnected with the fixed contact assembly and the movable contact assembly.

As one aspect of the invention, a shorting switch for eliminating arcing faults in power distribution equipment comprises: a vacuum switch comprising a vacuum envelope containing a fixed contact assembly and a movable contact assembly movable along a longitudinal axis between a closed circuit position in electrical contact with the fixed contact assembly and an open circuit position spaced apart from the fixed contact assembly; a driven member; a mount mounting the driven member for linear movement along a path substantially parallel to the longitudinal axis of the movable contact assembly, the driven member coupled to the movable contact assembly to move the movable contact assembly between the open circuit position and the closed circuit position with the linear movement of the driven member; a spring member having a compressed state and a released state, which moves the driven member and the movable contact assembly to the closed circuit position; a release member having an opening therein, the release member coupled to the driven member and normally maintaining the spring member in the compressed state; a charge disposed in the opening of the release member, the charge being actuated to fracture the release member and release the spring member to the released state; and first and second terminals respectively electrically interconnected with the fixed contact assembly and the movable contact assembly.

The spring member may be a compression spring having a first end and a second end. The release member may be a release bolt having a first end and a second end. The mount may comprise a bushing having a longitudinal opening and a longitudinal tube having a closed end and an open end, the longitudinal tube housing the compression spring, the release bolt and the charge. The first end of the compression spring may engage the closed end of the longitudinal tube. The first end of the release bolt may be coupled to the closed end of the longitudinal tube. The first end of the driven member may be coupled to the second end of the release bolt. The bushing may rest in the open end of the longitudinal tube, the driven member may rest in the longitudinal opening of the bushing, and the second end of the compression spring may bias the driven member to move the movable contact assembly to the closed circuit position after actuation of the charge.

The charge may be an electrically activated, chemical charge. The charge may be activated to provide a shock wave to fracture the release member. The release member may be a release bolt having a body and a breakline disposed thereon to locate and control fracture of the release bolt responsive to the shock wave. The breakline may have a predetermined depth in the body of the release bolt. The spring member may have a predetermined compression force, with the release bolt being structured to maintain at least the compression force until after the charge is activated.

As another aspect of the invention, a shorting system for eliminating arcing faults in power distribution equipment comprises: a vacuum switch comprising a vacuum envelope containing a fixed contact assembly and a movable contact assembly movable along a longitudinal axis between a closed circuit position in electrical contact with the fixed contact assembly and an open circuit position spaced apart from the fixed contact assembly; a driven member; a mount mounting the driven member for linear movement along a path substantially parallel to the longitudinal axis of the movable contact assembly, the driven member coupled to the movable contact assembly to move the movable contact assembly between the open circuit position and the closed circuit position with the linear movement of the driven member; a spring member having a compressed state and a released state, which moves the driven member and the movable contact assembly to the closed circuit position; a release member having an opening therein, the release member coupled to the driven member and normally maintaining the spring member in the compressed state; a charge disposed in the opening of the release member, the charge being actuated to fracture the release member and release the spring member to the released state; first and second terminals respectively electrically interconnected with the fixed contact assembly and the movable contact assembly; and means for detecting an arcing fault and responsively activating the charge disposed in the opening of the release member, wherein the activated charge fractures the release member, which releases the spring member, which drives the driven member to move the movable contact assembly to the closed circuit position to eliminate the arcing fault.

The charge may include an electrical input, the means for detecting an arcing fault and responsively activating the charge may comprise means for detecting the arcing fault and responsively outputting a trigger signal, and means for detecting the trigger signal and responsively outputting an activation signal to the electrical input of the charge.

As another aspect of the invention, a shorting switch for eliminating arcing faults in power distribution equipment comprises: a vacuum switch comprising a vacuum envelope containing a fixed contact assembly and a movable contact assembly movable along a longitudinal axis between a closed circuit position in electrical contact with the fixed contact assembly and an open circuit position spaced apart from the fixed contact assembly; a driven member having a longitudinal opening with a circumferential groove therein; a mount mounting the driven member for linear movement along a path substantially parallel to the longitudinal axis of the movable contact assembly, the driven member coupled to the movable contact assembly to move the movable contact assembly between the open circuit position and the closed circuit position with the linear movement of the driven member; a spring member having a compressed state and a released state, which moves the driven member and the movable contact assembly to the closed circuit position; a ball-lock member having a plurality of ball bearings and a push rod with a circumferential groove therein, the ball bearings engaging the circumferential groove of the longitudinal opening of the driven member to hold the spring member in the compressed state and to hold the movable contact assembly in the open circuit position; means for driving the push rod of the ball-lock member into the longitudinal opening of the release member to cause the ball bearings to engage the circumferential groove of the push rod of the ball-lock member and to release the driven member, in order to move the movable contact assembly to the closed circuit position; and first and second terminals respectively electrically connected to the fixed contact assembly and the movable contact assembly.

The means for driving the push rod may be a solenoid having a plunger, which drives the push rod of the ball-lock member into the longitudinal opening of the release member when the solenoid is actuated.

As another aspect of the invention, a shorting system for eliminating arcing faults in power distribution equipment comprises: a housing; a vacuum switch comprising a vacuum envelope containing a fixed contact assembly and a movable contact assembly movable along a longitudinal axis between a closed circuit position in electrical contact with the fixed contact assembly and an open circuit position spaced apart from the fixed contact assembly; a driven member; a mount mounting the driven member in the housing for linear movement along a path substantially parallel to the longitudinal axis of the movable contact assembly, the driven member coupled to the movable contact assembly to move the movable contact assembly between the open circuit position and the closed circuit position with the linear movement of the driven member; a spring member having a compressed state and a released state, which moves the driven member and the movable contact assembly to the closed circuit position; a latch member, which normally latches the driven member to hold the spring member in the compressed state and to hold the movable contact assembly in the open circuit position, the latch member releasing the driven member to move the movable contact assembly to the closed circuit position, with the latch member having an end, which engages the driven member, and a pivot in the housing; means for detecting an arcing fault and responsively unlatching the end of the latch member to release the driven member to move the movable contact assembly to the closed circuit position; and first and second terminals respectively electrically interconnected with the fixed contact assembly and the movable contact assembly.

The end of the latch member may be a first end, and the latch member may also have a second end. The means for unlatching the latch member to release the driven member may be a solenoid having a plunger, which moves the second end of the latch member to pivot the latch member about the pivot and to cause the first end of the latch member to release the driven member.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
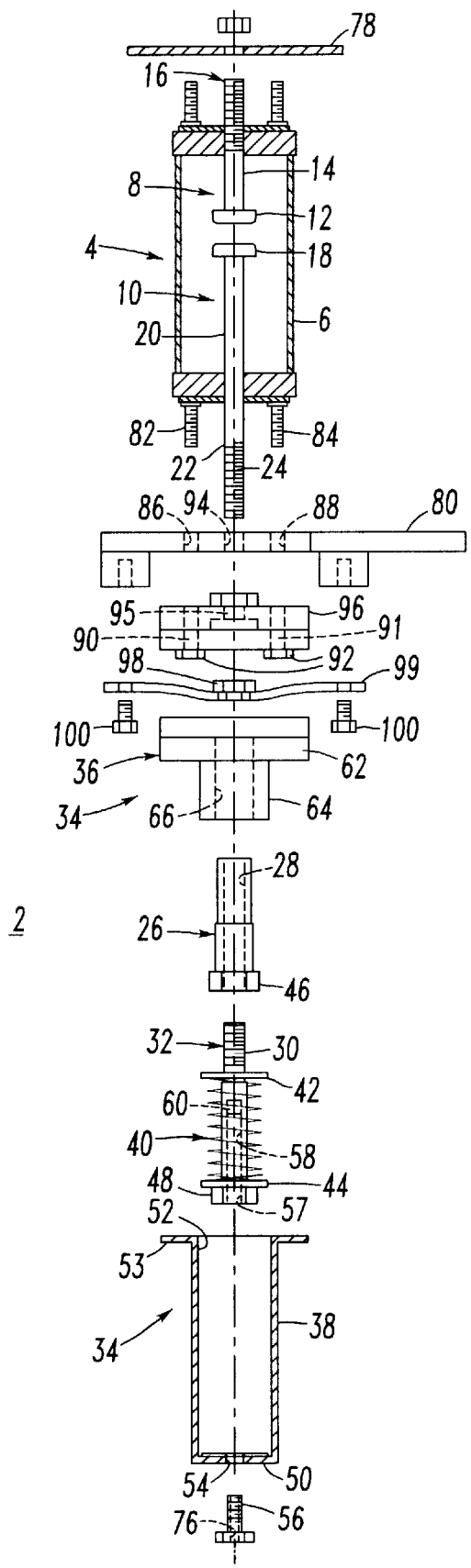
FIG. 1 is an exploded front elevation view of a single phase, spring-loaded, high-speed vacuum shorting switch employing a single vacuum interrupter (VI) in accordance with the present invention.

Referring to FIG. 1, a single phase, spring-loaded, high-speed vacuum shorting switch 2 eliminates arcing faults in power distribution equipment (not shown). The shorting switch 2 includes a single vacuum switch, such as a conventional vacuum interrupter (VI) 4 (e.g., a 3" VI bottle made by Eaton/Cutler-Hammer). As is well known, the vacuum interrupter 4 includes a vacuum envelope or sealed vacuum chamber (e.g., vacuum bottle 6) containing a fixed contact assembly 8 and a movable contact assembly 10 movable along a longitudinal axis between a closed circuit position (not shown) in electrical contact with the fixed contact assembly 8 and an open circuit position (as shown in FIG. 1) spaced apart from the fixed contact assembly 8.

The fixed contact assembly 8 includes a fixed contact 12 sealed within the sealed vacuum bottle 6 and an electrical conductor 14 connected to the fixed contact at one end thereof. The electrical conductor 14 sealably penetrates the sealed vacuum bottle 6 and terminates at a first terminal 16 at the other end of the fixed contact assembly 8. The movable contact assembly 10 includes a moveable contact 18 sealed within the sealed vacuum bottle 6 and moveable between a first position (as shown in FIG. 1), out of electrical communication with the fixed contact 12, and a second position (not shown), in electrical communication with the fixed contact 12. The movable contact assembly 10 further includes a movable electrical stem 20 connected to the moveable contact 18 at one end thereof. The movable electrical stem 20 sealably penetrates the sealed vacuum bottle 6 and terminates at a second terminal 22 at the other end of the moveable contact assembly 10. Preferably, the second terminal 22 is a copper stem including a plurality of threads 24.

Although a conventional VI 4 is shown, the shield (not shown) and the contacts 12,18 may be removed (e.g., as a cost reduction), the length of the movable electrical stem 20 may be adjusted (e.g., shortened), and the length of the fixed or stationary stem or terminal 16 may be adjusted (e.g., lengthened) in order to provide a wide range of lengths (e.g., asymmetrical lengths).

Other modifications to the conventional VI 4 may be made to further reduce the moving mass and/or the cost of the shorting switch 2. For example, reducing the mass will reduce the time to close. This may involve making a relatively short movable electrical stem 20, lengthening the stationary or fixed terminal 16, removing the contacts 12,18, removing the shield (not shown), and/or employing a reduced diameter of the terminals 16,22 (e.g., about ⅝" diameter).

A driven member such as, for example, an aluminum adapter shaft 26 having a threaded longitudinal opening 28 is threadably coupled at one end to the threads 24 of the movable electrical stem 20. The aluminum adapter shaft 26 is also threadably coupled at its other end to the threads 30 of a release member, such as release bolt 32.

A suitable mount 34, which includes a bushing 36 (e.g., nylon) and a spring cover tube 38, mounts the adapter shaft 26 for linear movement along a path substantially parallel to the longitudinal axis of the movable contact assembly 10. The adapter shaft 26 is coupled to the movable contact assembly 10 to move the same between the open and closed circuit positions of the vacuum interrupter 4 with the linear movement of such shaft.

A spring member, such as compression spring 40, has a compressed state (as shown in FIG. 1) and a released state (not shown), which moves the adapter shaft 26 and the movable contact assembly 10 to the closed circuit position. The release bolt 32, which is coupled to the shaft 26, normally maintains the compression spring 40 in the compressed state. The two ends of the compression spring 40 are disposed between a pair of washers 42,44 (e.g., steel). The head 46 of the adapter shaft 26 normally engages the washer 42 and the head 48 of the release bolt 32 engages the washer 44.

The longitudinal tube 38 has a closed end 50 and an open end 52 with a flange portion 53 (e.g., steel). An opening 54 in the end 50 threadably receives and is closed by a threaded retainer bolt 56 (e.g., steel), which is threadably coupled to a threaded portion 57 of a longitudinal opening 58 of the release bolt 32, thereby coupling the head 48 of the release bolt 32 to the closed end 50 of the longitudinal tube 38. The lower (with respect to FIG. 1) end of the compression spring 40 engages the washer 44 (and, thus, the head 48 of the release bolt 32 at the closed end 50 of the longitudinal tube 38).

Disposed within the release bolt opening 58 is a suitable charge, such as an electrically activated, chemical charge 60. The charge 60 is actuated to fracture the release bolt 32 and release the compression spring 40 to the released state. The longitudinal tube 38 houses the compression spring 40, the release bolt 32 and the charge 60, which is, of course, advantageous during the activation of such charge.

Figure 4:
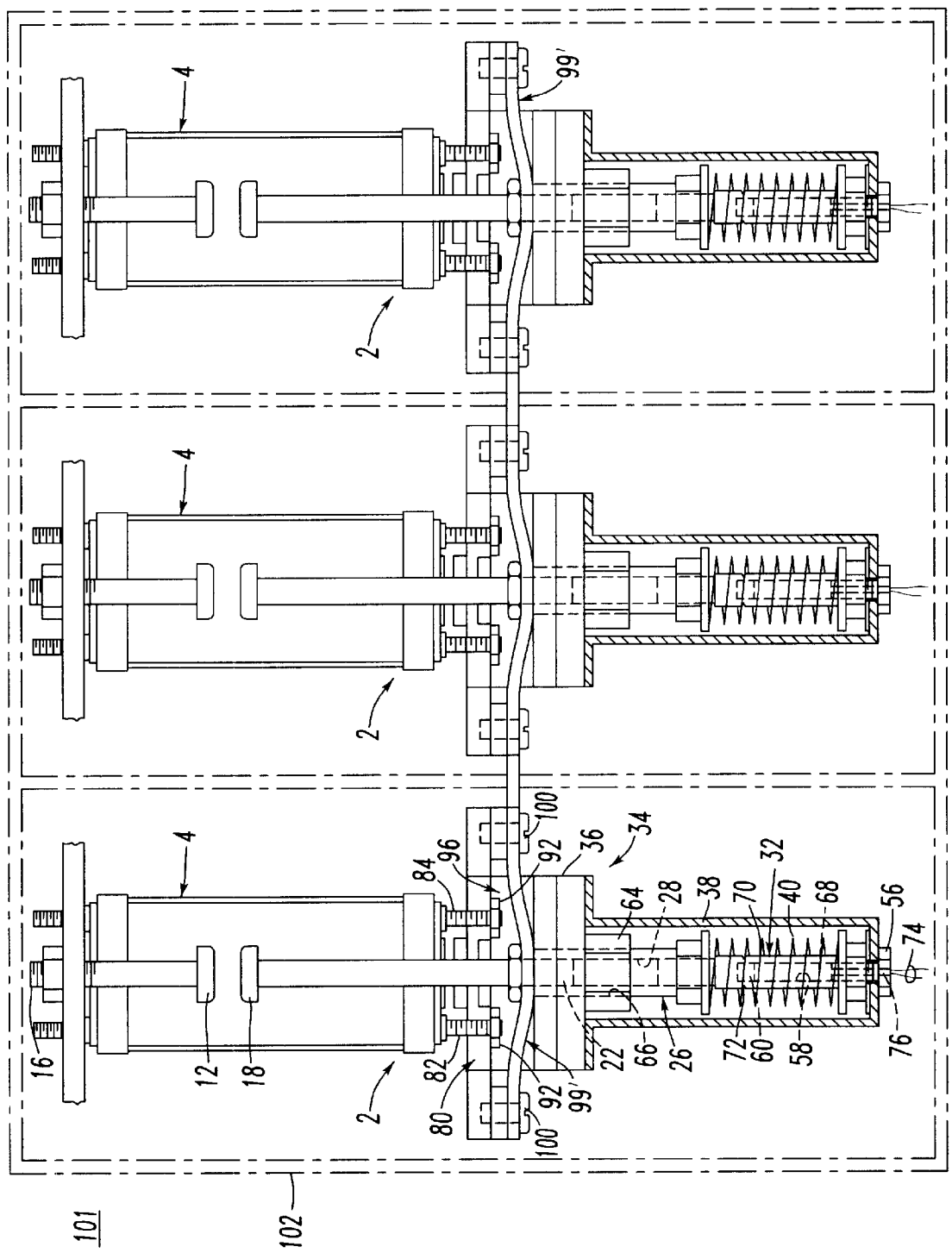
FIG. 4 is a front elevation view of a three-phase, spring-loaded, high-speed vacuum shorting switch employing three of the shorting switches of FIG. 1.

The bushing 36 includes an upper portion 62 and a lower portion 64 (e.g., with respect to FIG. 1). The upper portion 62 rests on the flange portion 53 of the longitudinal tube 38 and the lower portion 64 rests in the open end 52 of such tube. A longitudinal opening 66 passes through the upper and lower portions 62,64 of the bushing 36. As shown in FIG. 4, the adapter shaft 26 rests in the longitudinal opening 66 of the bushing 36.

Figure 2:
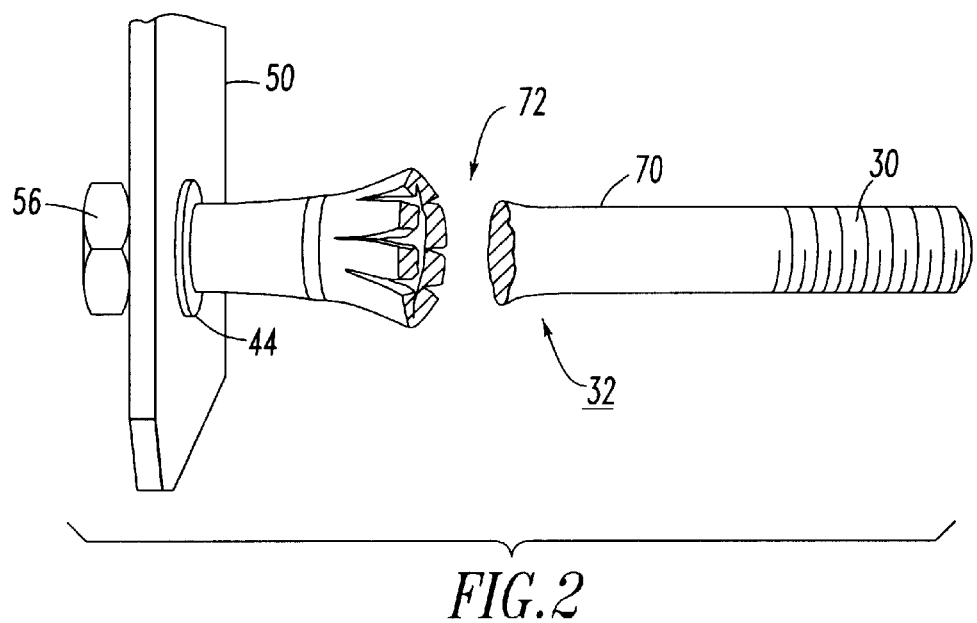
FIG. 2 is a plan view of the release bolt of FIG. 1, which is employed to hold the spring compressed, shown as being fractured after the charge is activated.

The opening 58 of the release bolt 32 provides a longitudinal cavity 68 (shown in FIG. 4) along the longitudinal axis of such release bolt. The charge 60 activated to provide a shock wave to fracture the release bolt 32. Preferably, as shown in FIGS. 2 and 4, the body 70 of the release bolt 32 has a breakline 72 disposed thereon to locate and control fracture of the release bolt 32 responsive to the shock wave. The breakline 72 has a predetermined depth in the release bolt body 70, and the compression spring 40 has a predetermined compression force, with the release bolt 32 being structured to maintain at least the compression force until after the charge 60 is activated.

The release bolt 32 normally compresses the compression spring 40. After activation of the charge 60 inside the release bolt 32, such bolt fractures at or about the breakline 72 (as shown in FIG. 2), thereby releasing the compression spring 40. In turn, the upper end (with respect to FIG. 1) of the spring 40 biases the washer 42 and the adapter shaft 26 to move the movable contact assembly 10 to the closed circuit position after actuation of the charge 60.

The exemplary charge 60 is a small electrically activated, chemical charge, such as model number RP-501 made by Reynolds Industries Systems, Inc. RISI). The RP-501 is a standard, end lighting, exploding bridge wire (EBW) detonator for use in general purpose applications (e.g., it is capable of detonating compressed TNT and COMP C-4). Although an exemplary detonator charge is employed, any suitable charge may be employed to fracture any suitable release member.

The release bolt 32 is employed to hold open the separable contacts 12,18 and to compress the spring 40 as shown in FIG. 1. Upon activation of the charge 60 inside the bolt 32, such bolt preferably fractures at a predetermined location, such as the breakline 72, thereby releasing the energy of the compression spring 40. The exemplary spring 40 closes and holds the contacts 12,18 closed with about 512 lbs. of force. This holding force prevents such contacts from reopening and vaporizing, while maintaining a suitably low contact resistance. For example, it is believed that at least about 300 lbs. of force is desired to hold the contacts 12,18 closed at a rated current of about 38 $kA_{RMS}$ symmetrical.

As shown in FIG. 4, the charge 60 includes an electrical input, such as a pair of conductors 74, which pass through the opening 58 of the release bolt 32 and through an opening 76 of the bolt 56. The charge 60 is suitably activated by an electrical signal on the conductors 74 to provide a shock wave to fracture the release bolt 32.

In the exemplary embodiment, the bolt body 70 has a 0.5-inch diameter and the bolt cavity 68 has a 0.295-inch diameter. The exemplary bolt 32 is 4.5 inches in length, with the cavity 68 being 2.0 inches deep from the bolt head 48, and the breakline 72 being 1.9 inches deep from the bolt head 48. The exemplary breakline 72 is employed to locate and control the fracture zone when the shock wave, created from the charge 60, fractures the metal release bolt 32.

The first and second terminals 16,22, which are respectively electrically interconnected with the fixed contact assembly 8 and the movable contact assembly 10, are adapted for electrical connection to first and second power lines 78,80, respectively. For example, the first power line 78 may be a copper power bus (e.g., a single phase; one phase of a three-phase power bus) and the second power line 80 may be a copper ground bus. Although a ground bus is shown, a neutral bus or a different phase may be employed.

As shown in FIG. 1, the vacuum interrupter 4 has a pair of mounting studs 82,84 (e.g., steel), which pass through respective openings 86,88 of the second power line 80 and through respective openings 90,91 of a bushing 96 and which are secured thereto by suitable fasteners 92. The second terminal 22 of the vacuum interrupter 4 passes through a suitably sized opening 94 of the second power line 80 and through an opening 95 of the bushing 96 (e.g., nylon). The bushing 96 is secured with respect to the second terminal 22 by a nut 98 (e.g., brass). The nut 98 is suitable attached (e.g., welded; brazed) to a flexible shunt 99 (e.g., a copper laminate), which is suitable electrically connected to the second power line 80 by a pair of fasteners 100 (e.g., brass) at opposite ends of the shunt 99. As discussed above, the second terminal 22 is coupled to the adapter shaft 26 for movement therewith and is electrically connected to the second power line 80 by the flexible shunt 99. The flexible shunt 99 is movable between and is preferably insulated by the upper and lower nylon bushings 96,36.

Figure 3:
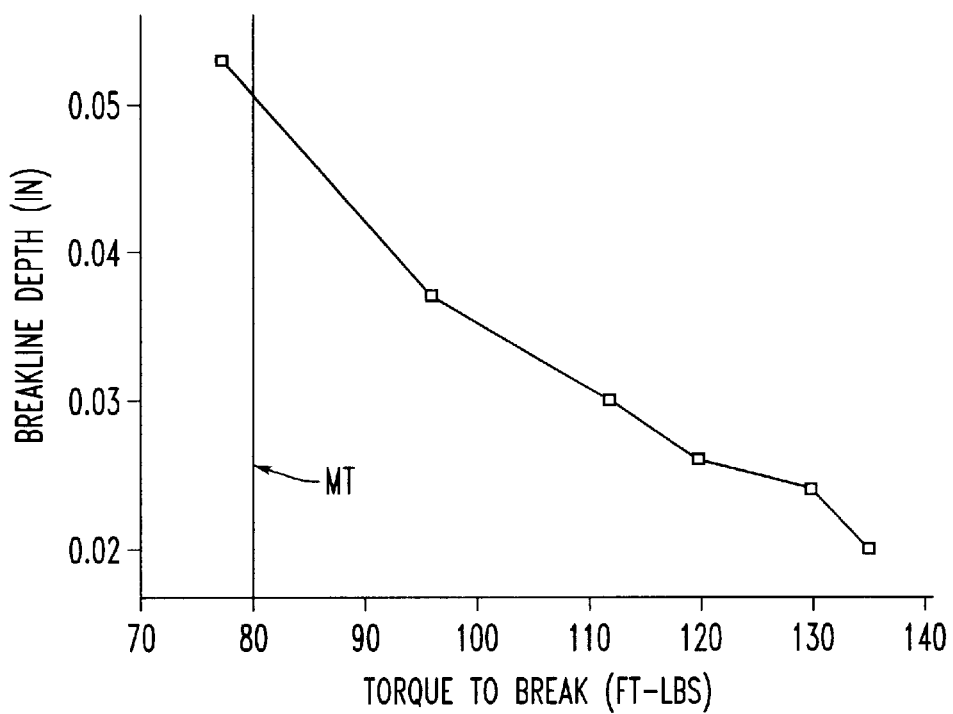
FIG. 3 is a plot of breaking torque versus breakline depth for the release bolt of FIG. 1.

FIG. 3 shows the result obtained from testing the torque required to fracture a ½" diameter bolt with a 0.295" diameter hole for the charge. A breakline (e.g., 72 of FIGS. 2 and 4) is employed to locate and control the fracture zone when the shock wave, created from the charge 60, fractures the metal. The vertical line (MT) represents the minimum torque on the release bolt 32 suitable to fully compress the compression spring 40. The plot shows the maximum depth of the breakline 72 while still maintaining a spring force of about 1200 pounds plus a suitable safety factor. The exemplary release bolt 32 is "grade 5" and can safely withstand a tensile stress of about 120,000 PSI without fracturing. An optimum breakline depth of about 0.025 inch or 0.03 inch is preferably employed to reliably fracture the exemplary bolt 32 with the exemplary charge 60 and still allow the spring 40 to be compressed solid and held with a suitable safety margin.

FIG. 4 shows a three-phase, spring-loaded, high-speed vacuum shorting switch 101 employing three of the shorting switches 2 of FIG. 1. For example, the three first terminals 16 of the three shorting switches 2 may be respectively electrically connected with three corresponding power busses (e.g., phases A, B and C). The three second terminals 22 of the three shorting switches 2 may be electrically connected to a common ground bus (not shown) by the common flexible shunt 99'. The three-phase shorting switch 101 may employ, for example, a conventional molded housing 102 without an operating mechanism.

The closing times of the shorting switches 2 of FIG. 1 depend upon the amount of mass being moved and on the force applied by the compression springs 40. For example, the exemplary shorting switches 2,101 are capable of being activated in the presence of an arcing fault in medium voltage switchgear and are able to maintain contact closure under medium voltage operating circuit parameters (e.g., 15 $kV_{RMS}$ at 38 $kA_{RMS}$).

Figure 5A:
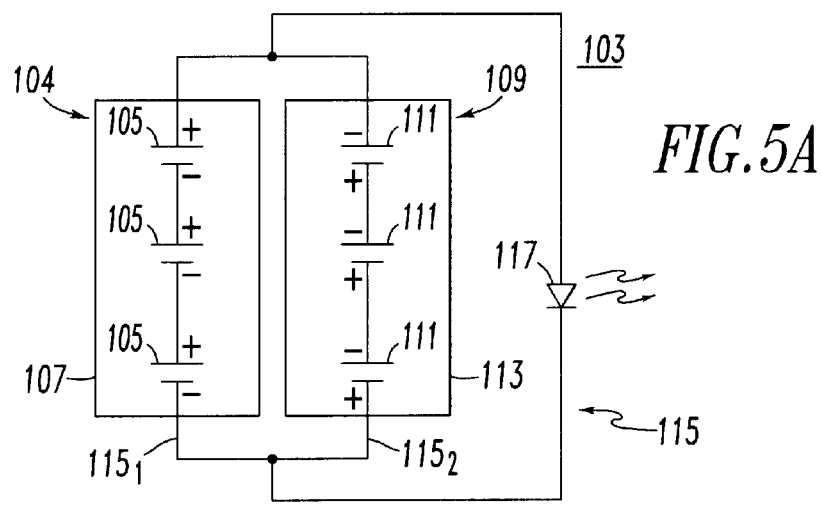
FIG. 5A is a schematic diagram of an arcing fault sensor suitable for use with the shorting switch of FIG. 1.

One form of an arcing fault sensor unit suitable for use with the shorting switches 2,101 is shown in FIG. 5A. The sensor unit 103 includes the first photovoltaic device 104 including at least one, or a plurality of series connected photovoltaic cells 105, and a first filter 107 which filters light incident upon the photovoltaic cells 105. This first filter 107 has a passband centered on the characteristic wavelength, e.g., 521.820 nm, of the arcing material.

The sensor 103 includes a second photovoltaic device 109, which also includes one or more series connected photovoltaic cells 111, and a second filter 113 which filters light incident upon the photovoltaic cells 111 and has a passband that does not include the characteristic wavelength of the arcing material, e.g., centered on about 600 nm in the exemplary system.

The first photovoltaic device 104 generates a sensed light electrical signal in response to the filtered incident light, and similarly, the second photovoltaic device 109 generates a background light electrical signal with an amplitude dependent upon the irradiance of light in the passband of the second filter 113. An electric circuit 115, having a first branch $115_1$ connecting the first photovoltaic cells 104 in series and a second branch $115_2$ similarly connecting the second photovoltaic cells 111 in series, connects these two electrical signals in opposition to a light-emitting device such as a light-emitting diode (LED) 117. When arcing is present, the sensed light electrical signal generated by the first photovoltaic device 104 exceeds the background light electrical signal generated by the second photovoltaic device 109 by a threshold amount sufficient to turn on the LED 117. While in the absence of arcing, the first photovoltaic device 104 will generate a sensed light electrical signal due to some irradiance in the passband of the first filter 107, it will be insufficient to overcome the reverse bias effect of the background light signal generated by the second photovoltaic device 109 on the LED 117. In fact, where the background light is fluorescent, from an incandescent bulb or a flashlight all of which have very low irradiance in the passband of the first filter 107, but significant irradiance in the passband of the second filter 113, the background light electrical signal will significantly exceed the sensed light electrical signal and strongly reverse bias the LED 117. The filters 107 and 113 can be interference filters, although lower cost bandpass filters could also be utilized.

Figure 5B:
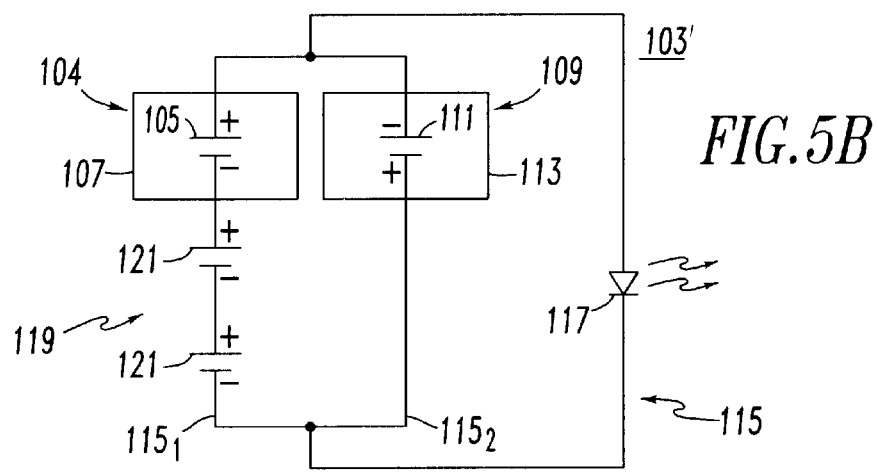
FIG. 5B is a schematic diagram of another arcing fault sensor suitable for use with the shorting switch of FIG. 1.

An alternate embodiment of the sensor unit 103' shown in FIG. 5B adds a bias generator 119 in the form of one or more additional photovoltaic cells 121 connected in series with the first photovoltaic device 104 in the first branch $115_1$ of the electrical circuit 115. This puts a forward bias on the LED 117 so that fewer or smaller filtered photovoltaic cells 105 and 111 can be used. This also reduces the size and therefore the cost of the filters 107 and 113. As the additional photovoltaic cells 121 are not provided with filters, the total cost of the sensor is reduced. The embodiment of FIG. 5B can be modified as shown in FIG. 5C to place the bias generating cells 121 of the sensor 103" in series with both filtered photovoltaic cells 105 and 111, but still provide the same effect of forward biasing the LED 117.

Figure 5C:
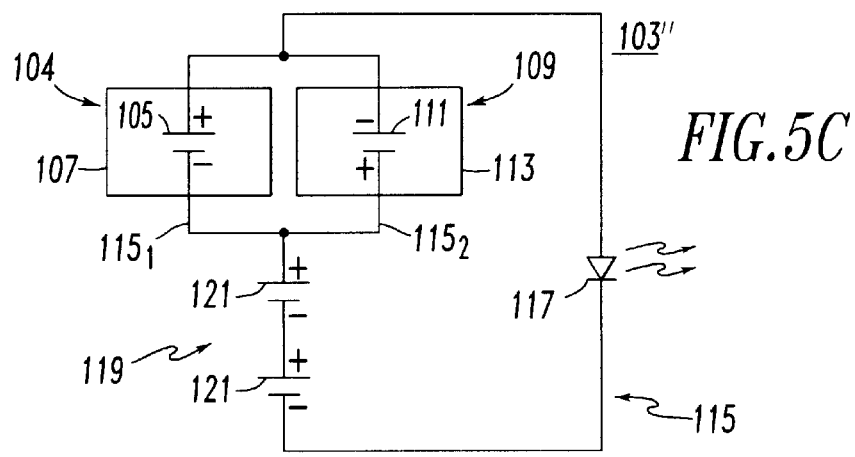
FIG. 5C is a schematic diagram of a modified form of the arcing fault sensor of FIG. 5B.

Through their utilization of photovoltaic cells 105, 111 and 121, the sensors 103 and 103' of FIGS. 5A–5C are self-energized.

Figure 6:
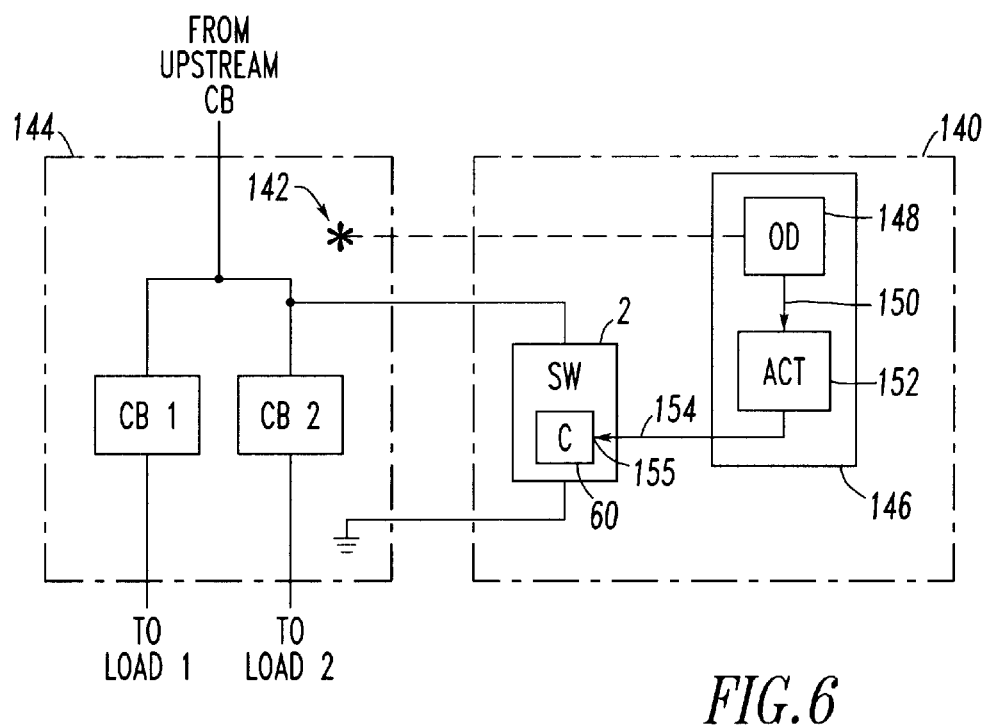
FIG. 6 is a block diagram of a shorting system including the shorting switch of FIG. 1.

FIG. 6 shows a shorting system 140 including one or more shorting switches 2 of FIG. 1 (only one switch (SW) 2 is shown in FIG. 6). The shorting system 140 eliminates an arcing fault 142 in medium voltage power distribution equipment 144 (e.g., switchgear). The shorting system 140 also includes a detection and activation circuit 146 for detecting the arcing fault 142 and responsively activating the shorting switch charge (C) 60, in order that the activated charge 60 results in the elimination of the arcing fault as discussed above in connection with FIGS. 1–3. The circuit 146 includes a detection (OD) circuit 148 for detecting the arcing fault 142 and responsively outputting one or more trigger signals 150, and an activation circuit (ACT) 152 for detecting the one or more trigger signals 150 and responsively outputting the activation signal 154 to the electrical inputs 155 of the charges 60. The detection circuit 148 utilizes photovoltaic cells in a sensor unit, such as one of the sensor units 103,103',103" of FIGS. 5A–5C.

Figure 7A:
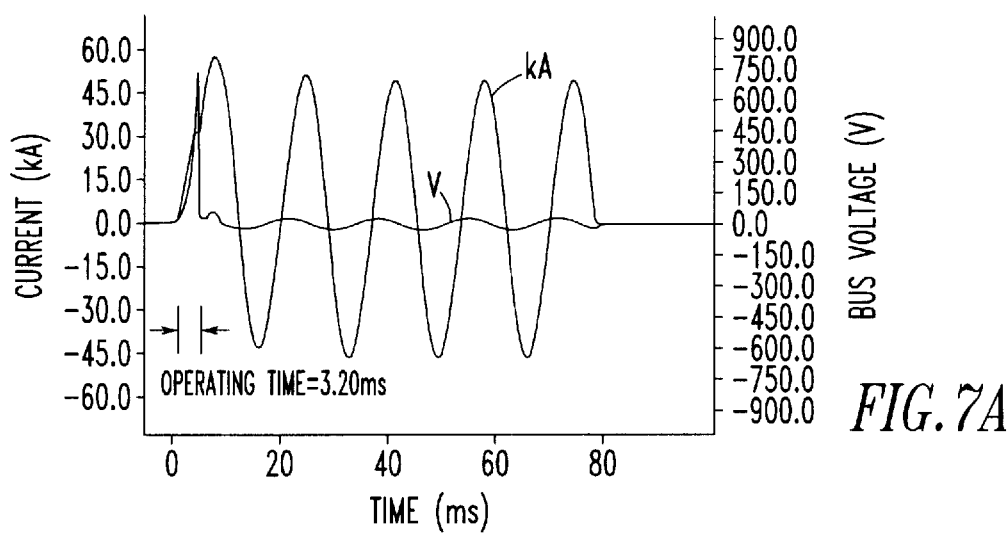
FIG. 7A is a plot of bus voltage and current over five cycles at 500V and 38 kA for a shorting switch similar to the shorting switch of FIG. 1.
Figure 7B:
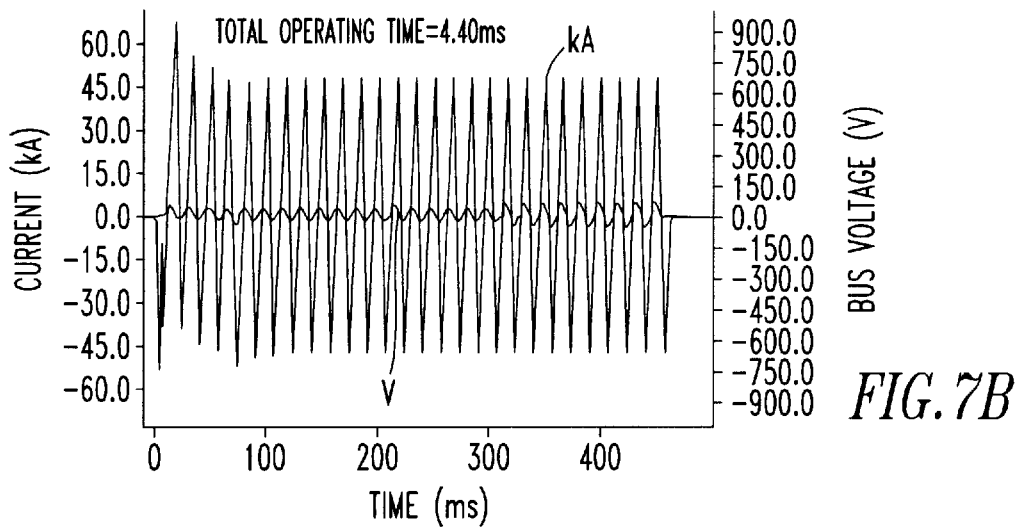
FIG. 7B is a plot of bus voltage and current over 27 cycles at 500V and 38 kA for a shorting switch similar to the shorting switch of FIG. 1.
Figure 7C:
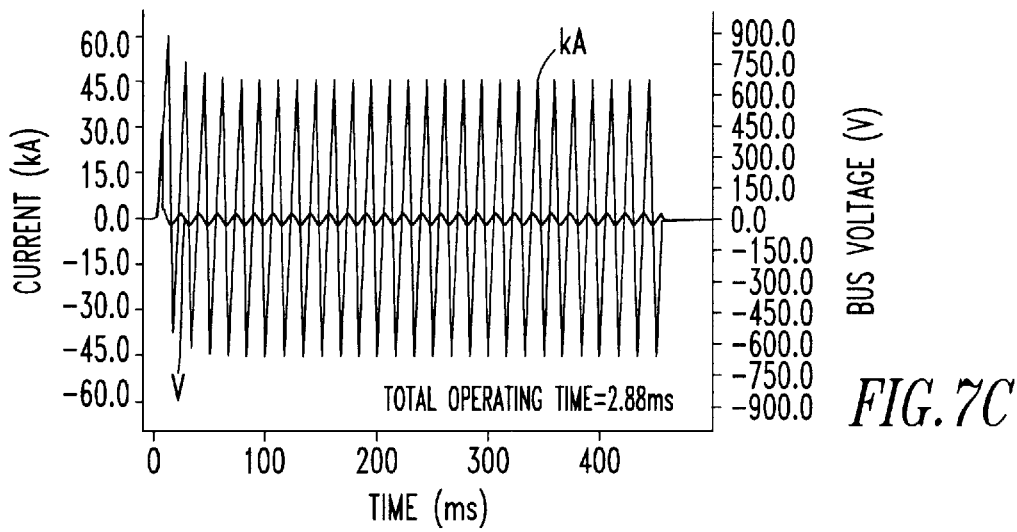
FIG. 7C is a plot of bus voltage and current over 27 cycles at 500V and 38 kA for a shorting switch similar to the shorting switch of FIGS. 7A and 7B except that symmetrical length movable and stationary VI electrical stems are employed.

FIGS. 7A–7C are test waveforms showing that a shorting switch similar to the shorting switch 2 of FIG. 1 is capable of operating within a suitable time (e.g., without limitation, less than about 4 ms) and can hold closed at about 38 $kA_{RMS}$ fault current for a duration of about 0.5 second. The conventional molded housing 102 of FIG. 4 makes for convenient mounting to the bus bar (e.g., 78 of FIG. 1) of the switchgear (e.g., 144 of FIG. 6) without any additional mold costs.

FIGS. 7A and 7B show plots of bus voltage and current over five cycles and 27 cycles, respectively, at 500V and 38 kA. In the test of FIG. 7A, the window in a molded case circuit breaker (not shown) used to generate arc light for testing purposes was clear (clean).

For the test of FIG. 7B, the window of the sensor unit is blocked to prevent arc light from reaching the detector, which is aimed at the arc-viewing window. A circuit breaker (not shown) arcs phase-to-phase on the line side and the sensor unit detects this. The sensor did not respond to the arc through the window in the circuit breaker since the light was blocked. But, since the breaker arced phase-to-phase, externally, the arc light was subsequently detected, albeit at a later time (4.4 ms total response time versus 3.20 ms). In response, the shorting switch 2 responsively quenches the arcing fault, thereby saving the circuit breaker.

FIG. 7C shows a plot of bus voltage and current over 27 cycles at 500V and 38 kA on a shorting switch, similar to the shorting switch for FIGS. 7A and 7B, except that symmetric length movable and stationary electrical stems are employed in the vacuum interrupter. In this test, the window of the sensor unit is darkened. The sensor response time is longer (0.82 ms versus 0.60 ms) and the total response time is less than the response time for FIGS. 7A and 7B since a smaller moving mass is employed.

Table 1 summarizes the shorting system operating times for the examples of FIGS. 7A–7C.

TABLE 1

| Sensor Time (ms) | Switch Time (ms) | Total Operating Time (ms) | Arc Source |
|---|---|---|---|
| 0.60 | 2.60 | 3.20 | Clean window |
| 1.58 | 2.84 | 4.42 | Window black, phase-phase |
| 0.82 | 2.06 | 2.88 | Dark window |

The exemplary spring-loaded vacuum shorting switch 2 successfully operates within about 3.2 ms (FIG. 7A), including sensing time, and holds closed for 27 cycles at 38 $kA_{RMS}$ (FIGS. 7B and 7C). As shown by Table 1, the shorting switches, switch, after triggering, between about 2.06 ms and about 2.84 ms and each one remains closed for the duration of the fault current.

Figure 8:
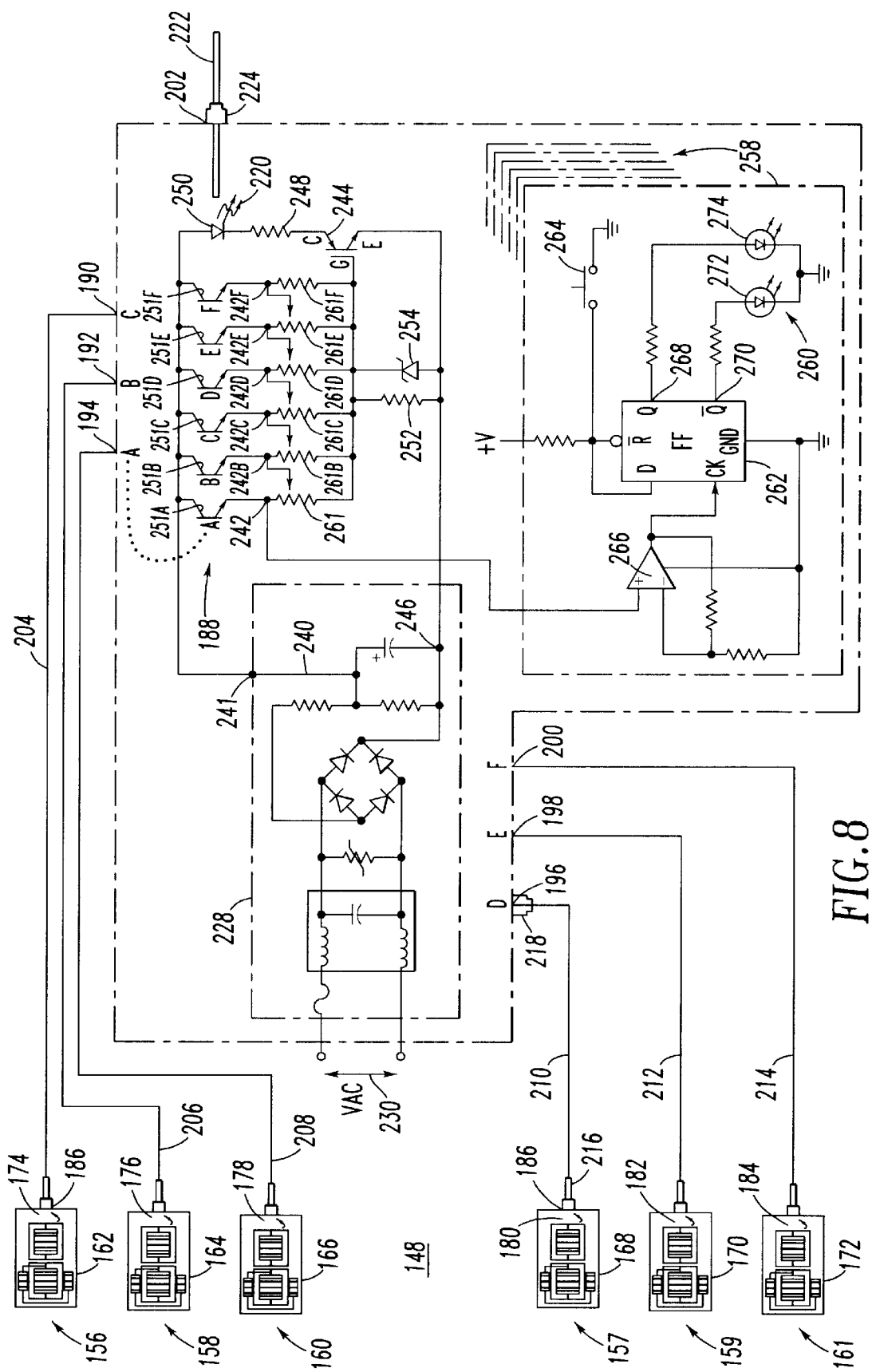
FIG. 8 is a block diagram in schematic form of the detection circuit of FIG. 6.

Referring to FIG. 8, the detection circuit 148 is shown. In the exemplary embodiment, the medium voltage power distribution equipment 144 of FIG. 7 includes two circuit breaker cells 156,157, two upper cable cells 158,159, and two lower cable cells 160,161, although the invention is applicable to a wide range of medium voltage power distribution equipment having any count (e.g., one or more) of cells in which an arcing fault may occur. As another example, U.S. Pat. No. 6,229,680, which is incorporated by reference herein, discloses a switchgear cabinet having a forward compartment, a middle compartment and a rear compartment. The forward compartment is divided vertically into three cells in which are housed electrical switching apparatus such as circuit breakers.

The detection circuit 148 includes six photovoltaic sensors 162,164, 166,168,170,172 adapted to detect arcing faults in the cells 156,158,160,157,159,161, and output optical trigger signals 174,176,178,180,182,184, respectively. These photovoltaic sensors 162,164,166,168,170,172 are self-powered from arc light and have an output 186 (as shown with sensor 162) with the respective optical trigger signals 174,176,178,180,182,184, which are responsive to the arc light. In the exemplary embodiment, suitable photovoltaic sensors are shown in FIGS. 5A–5C, although any suitable sensor for detecting any characteristic of an arcing fault may be employed. In the exemplary embodiment, the detection circuit 148 is employed for each switchgear enclosure (not shown), with three photovoltaic sensors for each circuit breaker cell.

The detection circuit 148 further includes a suitable optical multiplexer 188 having a plurality of fiber optic inputs 190,192,194,196,198,200 and a fiber optic output 202. A plurality of suitable fiber optic cables 204,206,208, 210,212,214 are connected between the outputs 186 of the photovoltaic sensors 162,164,166,168,170,172 and the inputs 190,192,194,196,198,200, respectively, of the optical multiplexer 188. The fiber optic cables (as shown with cable 210) include a first connector 216 attached to the corresponding photovoltaic sensor output (as shown with the output 186 of sensor 168) and a second connector 218 attached to the corresponding optical multiplexer input (as shown with input 196).

Figure 9A:
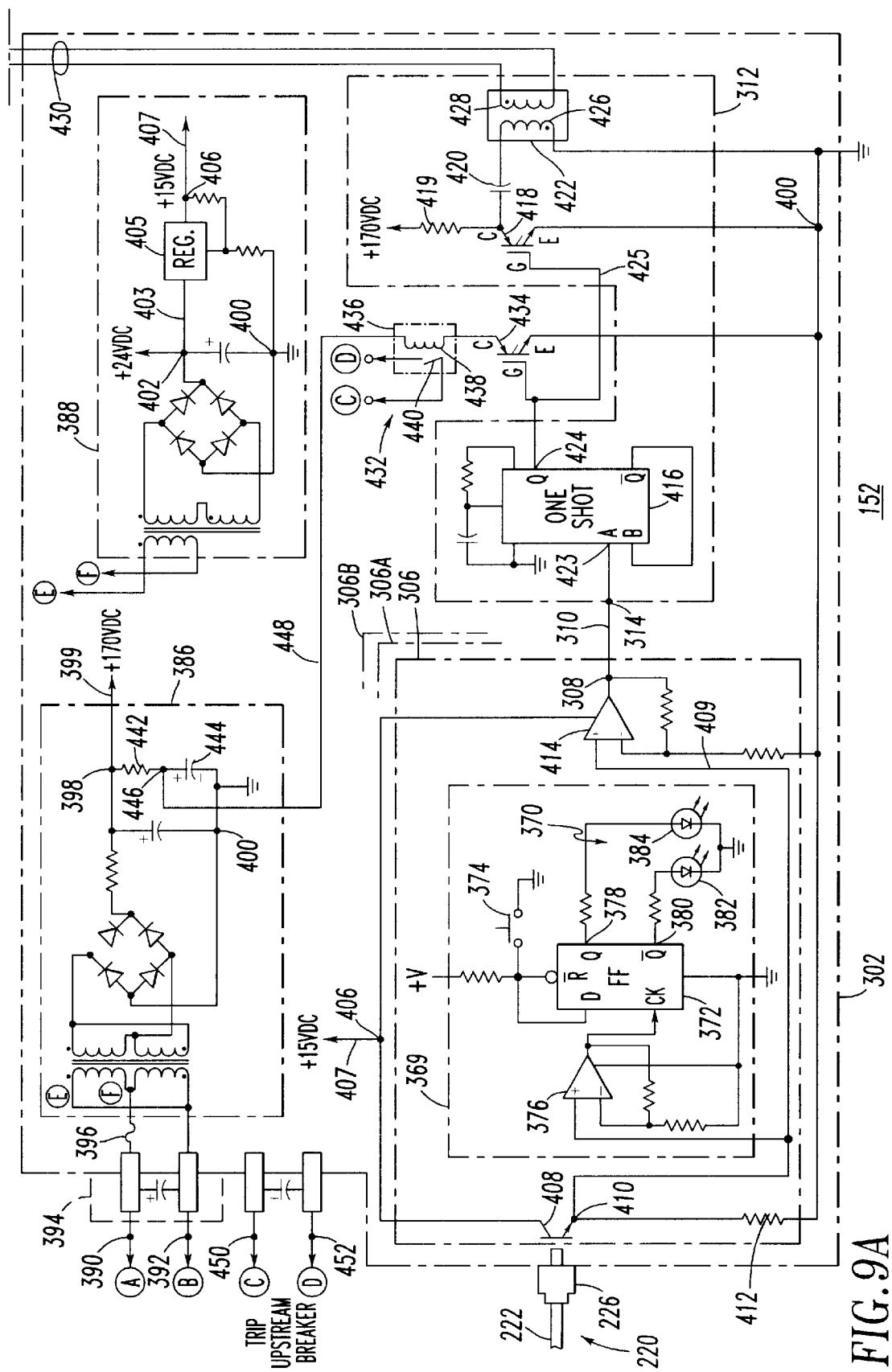
FIGS. 9A–9C are a block diagram in schematic form of the activation circuit of FIG. 6.

The output 202 of the optical multiplexer 188 outputs an optical trigger signal 220 to another fiber optic cable 222, which includes a first connector 224 attached to the multiplexer output 202. The other end (as shown in FIG. 9A) of fiber optic cable 222 includes a second connector 226, which is attached to the activation circuit 152. The optical multiplexer 188 functions to repeat any of the first optical trigger signals 174,176,178,180,182,184 to the second optical trigger signal 220. In operation, the photovoltaic sensors 162, 164,166,168,170,172 and the optical multiplexer 188 have a detection time of about 550 μs after initiation of an arcing fault event to the activation of the second optical trigger signal 220, although the invention is applicable to a wide range of response times. The detection time varies (e.g., about 300 μs to about 2 ms) as a function of the arc current magnitude and line of sight orientation of the sensor to the arc.

The detection circuit 148 further includes a suitable power supply, which in the exemplary embodiment is an AC/DC power supply 228, which inputs an AC line voltage 230 and outputs a suitable DC voltage 240 to the optical multiplexer 188 at node 241. For example, for input 194 (A), the optical multiplexer 188 has an electrical output 242, which is electrically connected to the gate of transistor 244 through resistor 261. The other five multiplexer inputs 192,190,196, 198,200 have similar outputs 242B,242C,242D,242E,242F, respectively. The emitter of the transistor 244 is electrically connected to the common 246 of the power supply 228, and the collector of the transistor 244 is electrically connected through a resistor 248 to the cathode of an output photodiode 250 of the optical multiplexer 188. The anode of the photodiode 250 and the collectors of the input phototransistors 251A–251F (e.g., similar to the phototransistor 408 of FIG. 9A) of the optical multiplexer 188 are electrically connected to the DC voltage node 241. A resistor 252 is electrically connected between the gate and emitter of the transistor 244. A zener diode 254 is electrically connected in parallel with the resistor 252.

The detection circuit 148 preferably includes a plurality of suitable indication circuits, such as 258 for multiplexer input A, having an input 259 and one or more indication outputs 260 for indicating the occurrence of an arc fault trigger event as determined by a suitable voltage at the optical multiplexer output 242 as measured across resistors 261 and 252. Other circuits 258 are provided for the other multiplexer inputs, which have resistors 261B, 261C, 261D, 261E, 261F electrically connected between the respective outputs 242B, 242C, 242D, 242E, 242F and the gate of transistor 244. Normally, the flip-flop (FF) 262 has a reset state, which is established by pushbutton 264. Otherwise, in response to an arc trigger event, the positive voltage across the resistors 261 and 252, as buffered by operational amplifier 266, causes the flip-flop outputs 268,270 to change state. In response, a green LED 272 is extinguished, and a red LED 274 is illuminated. Following manual operation of the pushbutton 264, the flip-flop outputs 268,270 change state, again, with the red LED 274 being extinguished and the green LED 272 being illuminated.

Figure 9B:
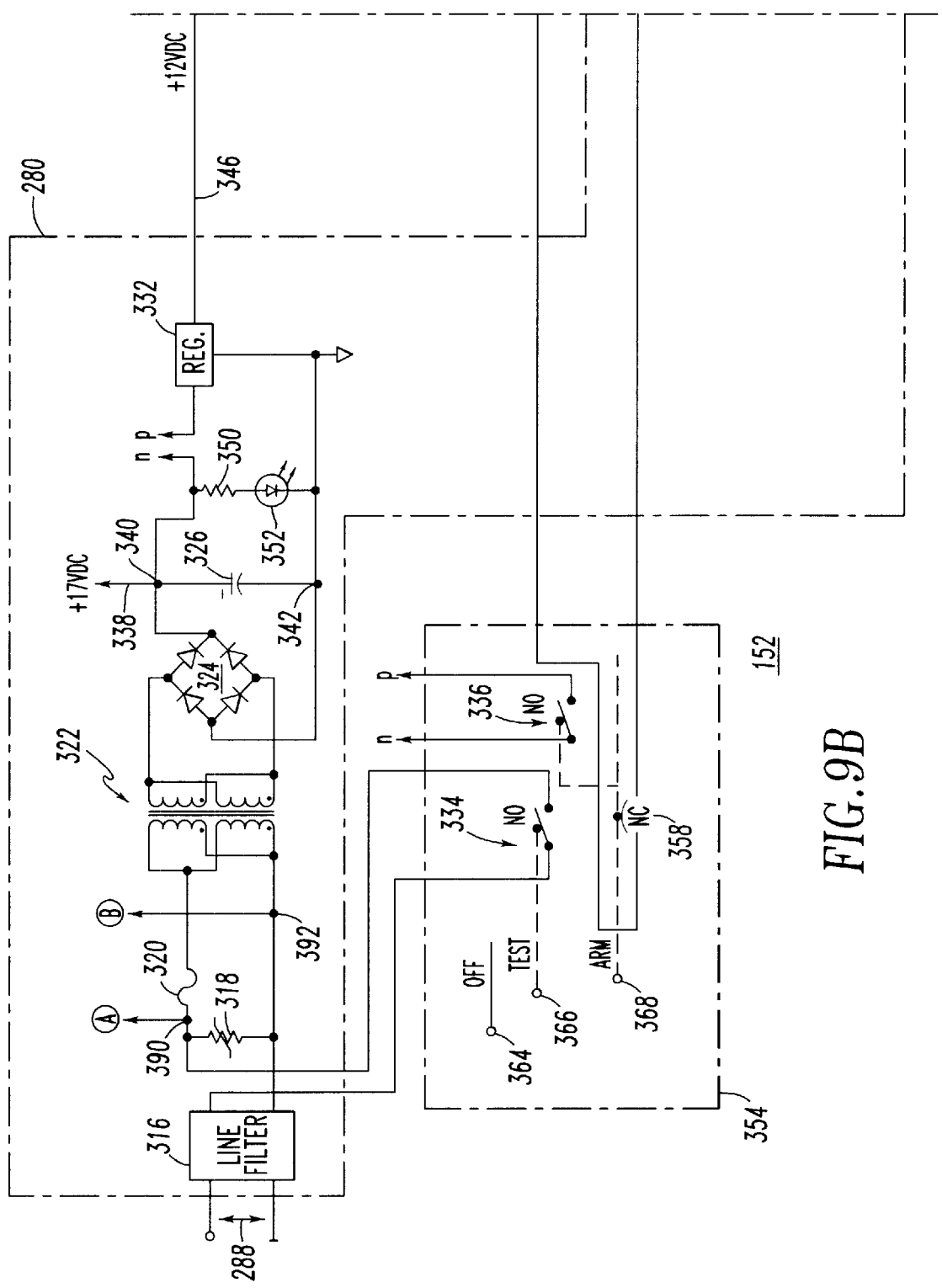

FIGS. 9A–9B show the activation circuit 152 of FIG. 7, which detects one or more of the trigger signals, such as the optical trigger signal 220 of FIG. 8, and responsively outputs the activation signal 154 to the electrical inputs 155 of the charges 60. In the exemplary embodiment, the activation circuit 152 is employed with a three-phase circuit breaker (not shown) having a pair of charges 60 for each of the shorting switches 2 for each of the three phases A,B,C, although the invention is applicable to any count of shorting switches 2 (e.g., one or more), any count of phases (e.g., one, two, three or more), any count of shorting switches per phase (e.g., one, two, or more), and any count of charges (e.g., one or more) per shorting switch.

Figure 9C:
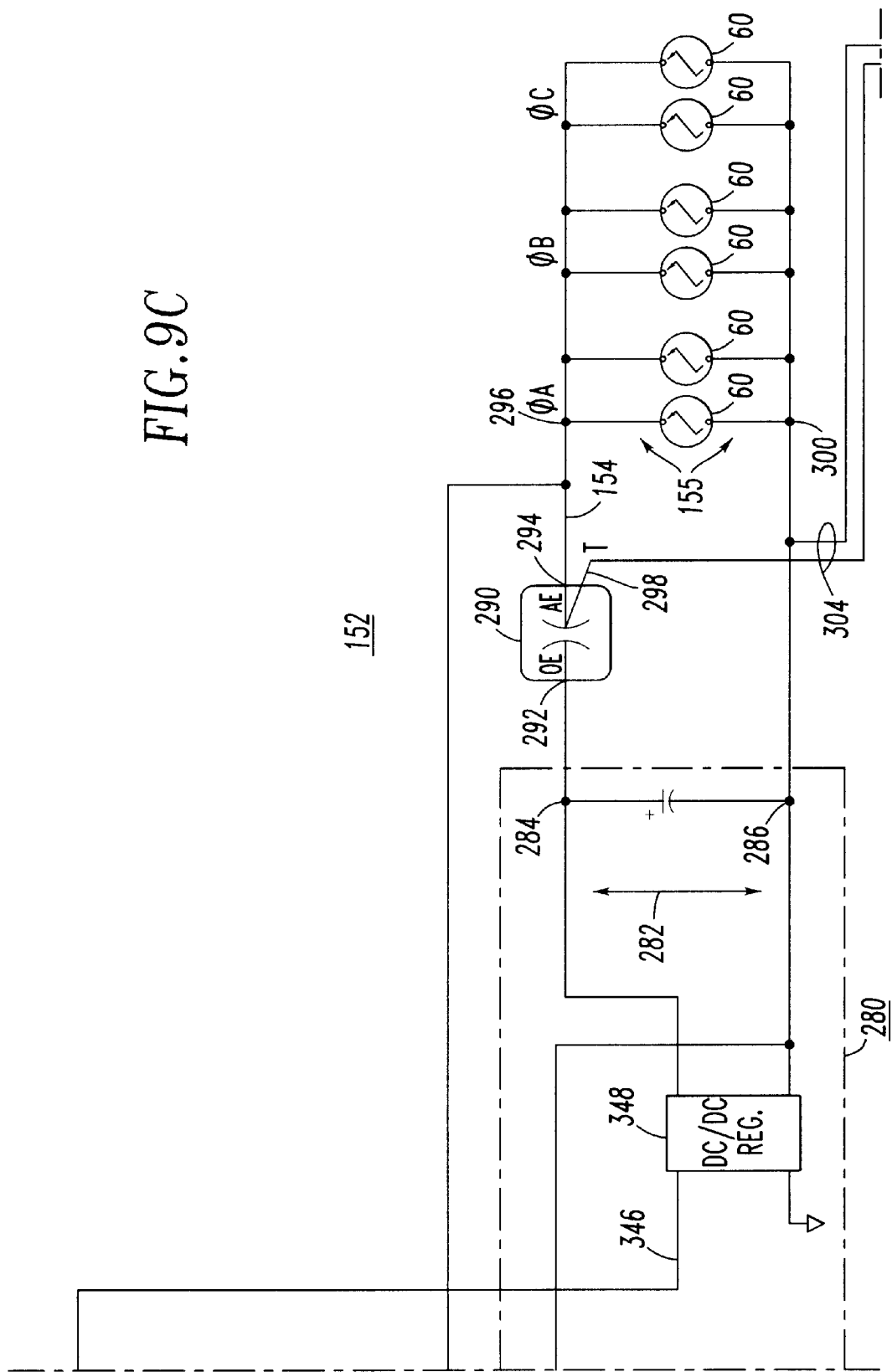

The activation circuit 152 includes a suitable high voltage power supply 280 (FIGS. 9B–9C), which generates a suitable charge voltage 282 (e.g., without limitation, 2000 VDC) between nodes 284,286 from an input voltage 288 (e.g., without limitation, 120 $VAC_{RMS}$). A triggerable spark gap 290, such as a model GP-486 marketed by Perkin Elmer of Salem, Mass., has an input 292 electrically connected to the node 284, an output 294 electrically connected to a first input 296 of the charges 60, and a trigger control input 298. The other node 286 is electrically connected to the second input 300 of the charges 60. Normally, the spark gap 290 presents an open circuit between the input 292 and output 294. In response to a suitable trigger voltage between the trigger control input 298 and the output 296 (with each of the charges essentially providing a near short circuit between the inputs 296,300), the spark gap 290 becomes a short circuit, thereby electrically connecting the node 284 to the first charge input 296 and, thus, electrically connecting the charge voltage 282 to the charge electrical inputs 155.

A circuit 302 detects the one or more trigger signals 220 and responsively outputs a control signal 304 (with respect to the node 286) to the control input 298 of the spark gap 290. As discussed above, in responsive to the control signal 304, the spark gap 290 outputs the activation signal 154 to the electrical inputs 155 of the charges 60.

The circuit 302, which is preferably housed in a suitable EMI/magnetic shield (not shown), includes one or more circuits 306,306A,306B for detecting the one or more trigger signals 220 (only one trigger signal is shown), respectively. For example, zero, one or more (e.g., 306A,306B) additional circuits may be employed in the event that the medium voltage power distribution equipment (e.g., 144 of FIG. 7) includes more than six exemplary arc fault detection locations. The circuits 306,306A,306B include a common output 308 having a detected trigger signal 310.

A circuit 312 has an input 314, which is electrically connected to the common output 308 of the circuits 306, 306A,306B. The circuit 312 outputs the control signal 304 responsive to the detected trigger signal 310.

The power supply 280 of FIG. 9B includes a line-conditioning filter 316, an MOV 318, a fuse 320, a transformer 322, a full wave bridge 324, a capacitor 326 and a DC/DC regulator (REG) 332. When contacts 334,336 are closed, the power supply 280 functions to output a suitable DC voltage 338 (e.g., +17 VDC) between power supply node 340 and common node 342. In turn, the DC/DC regulator 338 outputs a suitable DC voltage 346 (e.g., +12 VDC) to a suitable high voltage DC/DC regulator 348 of FIG. 9C. In turn, the regulator 348 generates the charge voltage 282 between the nodes 284,286. The series combination of a resistor 350 and an LED 352 is electrically connected in parallel with the capacitor 326 to indicate the DC voltage 338 and the test mode as selected by the closed state of the contact 334.

Preferably, for safety considerations, a suitable switch 354 is provided with the normally open (NO) contacts 334,336 and a suitable normally closed (NC) contact 358 (e.g., one NC contact or plural NC contacts electrically connected in series). The switch 354 preferably includes a key (not shown), which key has three positions, including a first off position 364, a second test position 366, and a third arm position 368, and is removable in the off and arm positions 364,368. The states of the contacts 334,336,358 are static in each of the three key positions 364,366,368.

In the off position 364, the NO contacts 334,336 are open, thereby disabling the power supply 280, the regulators 332,348 and the circuit 302, and the NC contact 358 is closed, thereby ensuring that the activation signal 154 is suitably electrically connected to the common node 286.

In the test position 366, the NO contact 334 is closed, thereby enabling the DC voltage 338 (e.g., +17 VDC) at the power supply node 340, and the circuit 302. However, since the NO contact 336 remains open, the regulators 332,348 remain disabled.

In the arm position 368, first, the NC contact 358 is opened and, then, the NO contact 336 is closed. This safely removes the short circuit between the nodes 296,286 before the regulators 332,348 are enabled.

The circuit 306 preferably includes a suitable indication circuit 369, which is similar to the indication circuit 258 of FIG. 8. The circuit 369 has one or more indication outputs 370 for indicating that the trigger signal 220 has been received as determined by a suitable voltage at the node 410. Normally, the flip-flop 372 has a reset state, which is established by pushbutton 374. Otherwise, in response to the trigger signal 220, the voltage 409, as buffered by operational amplifier 376, causes the flip-flop outputs 378,380 to change state. In response, a green LED 382 is extinguished, and a red LED 384 is illuminated. Following manual operation of the pushbutton 374, the flip-flop outputs 378,380 change state, again, with the red LED 384 being extinguished and the green LED 382 being illuminated.

The circuit 302 includes a pair of power supplies 386,388, both of which are powered from nodes 390 and 392 of the power supply 280. The circuit 302 also includes a filter bushing 394, which further filters the switched line voltage between the nodes 390,392, and a fuse 396. The first power supply 386 has an output 398 with a suitable unregulated DC voltage 399 (e.g., +170 VDC) with respect to a ground node 400. The voltage 399 powers a portion of the circuit 312. The second power supply 388 has an output 402 with a suitable unregulated DC voltage 403 (e.g., +24 VDC) with respect to the ground node 400. The voltage 403 powers a DC/DC regulator 405, which has an output 406 with a suitable regulated DC voltage 407 (e.g., +15 VDC) with respect to the ground node 400. The voltage 407 powers the circuits 306,306A,306B.

As discussed above, the circuits 306,306A,306B detect the one or more optical trigger signals 220 (as shown with circuit 306) and have a common output 308 with the detected trigger signal 310. The circuit 306 includes a suitable phototransistor 408, which in the exemplary embodiment is a model OP802WSL marketed by Honeywell of Morristown, N.J., although any suitable phototransistor for optical signals may be employed. Whenever the optical trigger signal 220 is active, the phototransistor 408 generates a corresponding voltage 409 at output 410 by sourcing current through resistor 412 to the ground node 400. The voltage 409 is buffered by the non-inverting (+) input of operational amplifier 414, which provides the corresponding detected trigger signal 310 at the common output 308. The phototransistor 408 and the operational amplifier 414 are both powered from the power supply output 406 having the regulated DC voltage 407. The circuits 306A and 306B are similar to the circuit 306.

The circuit 312, which outputs the control signal 304 responsive to the detected trigger signal 310, includes a one-shot multivibrator 416, a transistor 418, resistor 419, capacitor 420, and a transformer 422. In response to the rising edge of the detected trigger signal 310, as detected at input 423, the multivibrator 416 provides a suitable pulse at output 424, which is connected by line 425 to the gate of the transistor 418. In turn, the transistor 418 turns on, thereby effectively electrically connecting the collector side of resistor 419 to the ground node 400. The step change in voltage (e.g., about −170 VDC) on the transformer side of capacitor 420 is communicated to the primary winding 426 of the transformer 422. In response, the transformer (inverted) secondary winding 428 provides a suitable positive voltage pulse, which is the control signal 304, to twisted pair conductors 430, which are electrically connected to the control input 298 of the spark gap 290 and the second input 300 of the charges 60. Preferably, the circuits 306,312 of the activation circuit 152 provide a minimal delay (e.g., without limitation, about 40 μs) between the activation of the optical trigger signal 220 and the activation of the control signal 304.

Preferably, the circuit 302 includes a circuit 432 for tripping an upstream circuit breaker (not shown) in response to the detected trigger signal 310 and the output pulse of the multivibrator output 424. The circuit 432 includes a transistor 434 and a relay 436 having a coil 438 and contacts 440. The power supply 386 includes the series combination of a resistor 442 and a capacitor 444, which combination is electrically connected between the nodes 398,400. The common node 446 of the resistor-capacitor combination sources a suitable voltage 448 (e.g., about +170 VDC) to one side of the relay coil 438. The other side of the relay coil 438 is switched by the transistor 434 to the ground node 400 in response to the output pulse of the multivibrator output 424. In response to the energization of the coil 438, the normally open (NO) contacts 440 are closed. The contacts 440, in turn, are electrically connected to terminals 450,452, which are adapted for electrical connection to the upstream circuit breaker by a suitable cable (not shown).

Preferably, the circuits 306,312,432 of the activation circuit 152 provide a suitable delay (e.g., without limitation, about 6 to 10 ms) between the activation of the optical trigger signal 220 and the closure of the NO contacts 440. This permits the charges 60 to initiate the relatively high-speed shorting of the arcing fault through the shorting switch(s) 2 of FIG. 1, with the prompt, albeit relatively slower, clearing of the short circuit(s) caused by such switch(s) 2, through the tripping of the upstream circuit breaker (not shown).

Preferably, the activation circuit 152 includes an output relay and contact (not shown) which is employed to enable an upstream circuit breaker (not shown) for the medium voltage power distribution equipment 144 of FIG. 7. The activation circuit 152 preferably further includes an annunciator circuit (not shown) which annunciates when such upstream circuit breaker is not enabled. Preferably, such upstream circuit breaker is enabled whenever the various power supply voltages (e.g., +12 VDC, +17 VDC, +170 VDC, +2000 VDC) of the activation circuit 152 are suitably energized.

Figure 10:
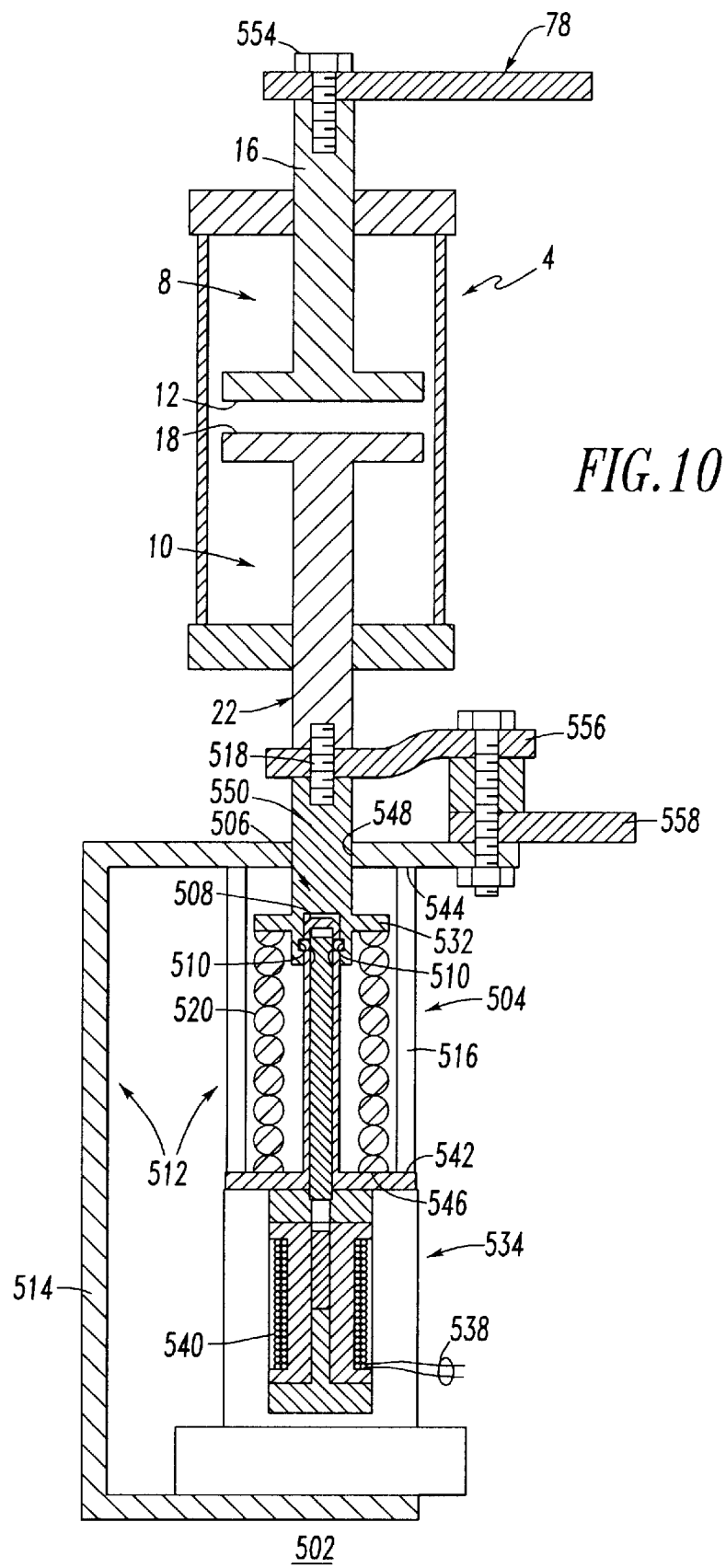
FIG. 10 is a cross-sectional view of a single phase, spring-loaded, high-speed vacuum shorting switch employing a single vacuum interrupter (VI) and a ball-lock mechanism in accordance with another embodiment of the present invention
Figure 11C:
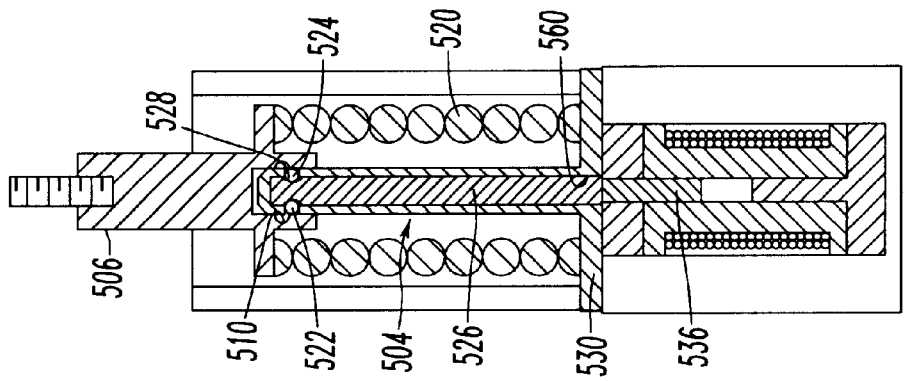
FIG. 11C shows the ball-lock mechanism of FIG. 10 with the VI contacts open, the solenoid plunger pushing the ball-lock push rod, and the ball bearings rolling down the circumferential groove of the push rod shaft.
Figure 11B:
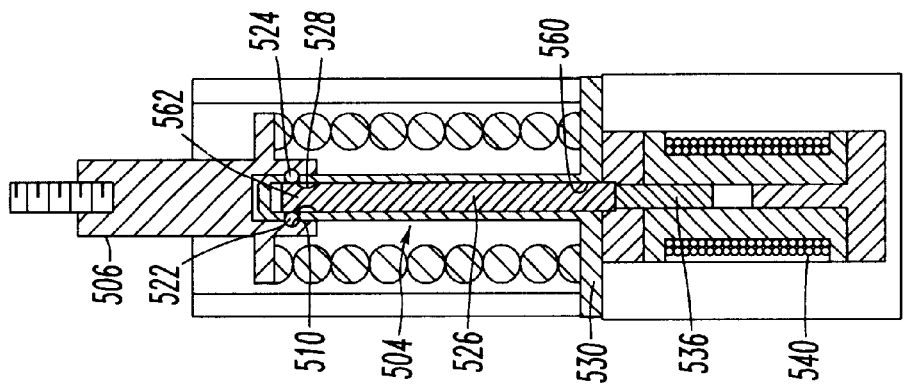
FIG. 11B shows the ball-lock mechanism of FIG. 10 with the VI contacts open, the solenoid plunger striking the ball-lock push rod, and the ball bearings sliding on the push rod shaft.

FIG. 10 shows a single phase, spring-loaded, high-speed vacuum shorting switch 502 employing the conventional vacuum interrupter (VI) 4 of FIG. 1 and a ball-lock mechanism 504. The switch 502 includes a driven member 506 having a longitudinal opening 508 with a circumferential groove 510 therein. A suitable mount 512, which includes a frame 514 and a spring cover tube 516, mounts the driven member 506 for linear movement along a path substantially parallel to the longitudinal axis of the movable contact assembly 10. The driven member 506 is suitably coupled (e.g., by threaded rod 518) to the second terminal 22 of the movable contact assembly 10 to move such assembly between the open circuit position (as shown in FIG. 10) and the closed circuit position (shown in phantom line drawing in FIG. 11D) with the linear movement of the driven member 506 (as shown in FIGS. 11B–11D).

Figure 11A:
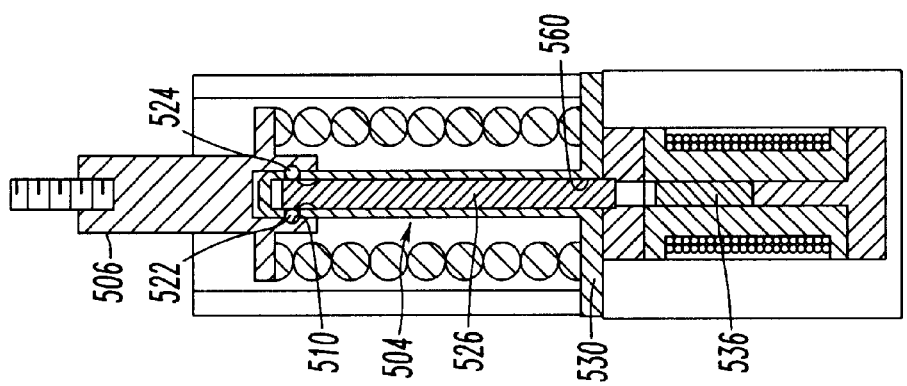
FIG. 11A shows the ball-lock mechanism of FIG. 10 with the VI contacts open, the solenoid plunger stationary, and the ball-lock not released.
Figure 11D:
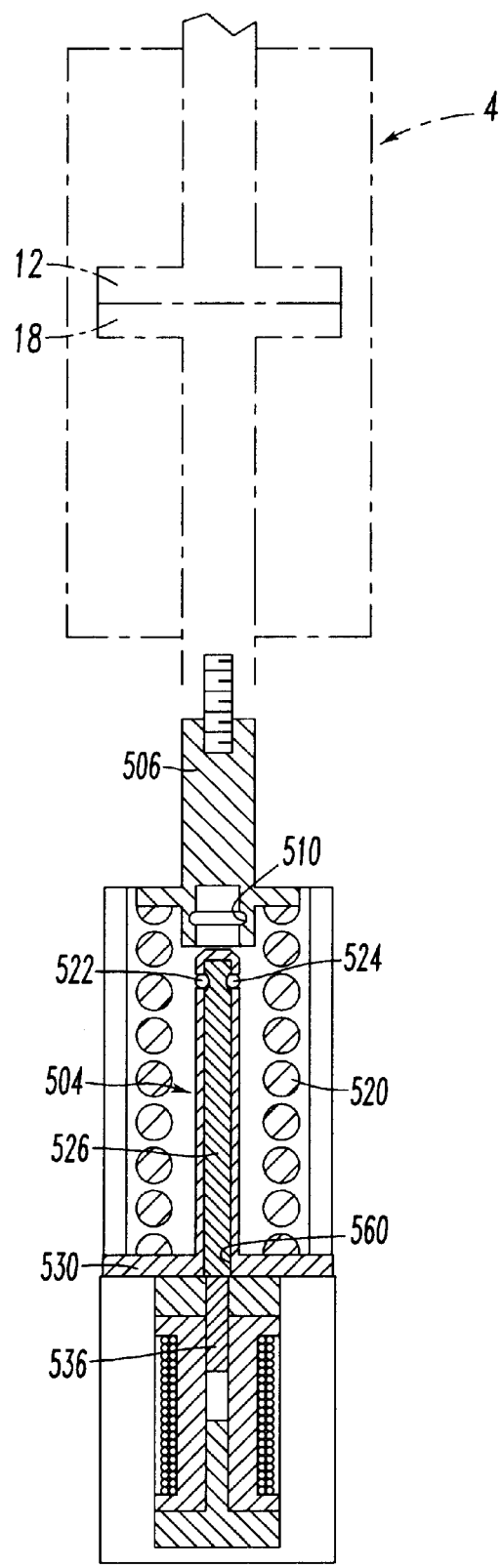
FIG. 11D shows the ball-lock mechanism of FIG. 10 with the VI contacts closing, the solenoid plunger stopping, and the ball-lock push rod shaft releasing the spring.

A suitable spring member, such as compression spring 520, has a compressed state (as shown in FIG. 10) and a released state (as shown in FIG. 11D), which moves the driven member 506 and the movable contact assembly 10 to the closed circuit position.

The ball-lock mechanism 504 has a plurality of ball bearings, such as 522,524, and a push rod 526 with a circumferential groove 528 therein. As shown in FIG. 10, the ball bearings 522,524 normally engage the circumferential groove 510 of the longitudinal opening 508 of the driven member 506 to hold the spring member 520 in the compressed state between a flange portion 530 of the ball-lock mechanism 504 and a flange portion 532 of the driven member 506. This, also, holds the movable contact assembly 10 in the open circuit position of FIG. 10.

A suitable electromechanical mechanism, such as a solenoid 534, includes a plunger 536 for driving the ball-lock push rod 526 into the longitudinal opening 508 of the driven member 506 to cause the ball bearings 522,524 to engage the circumferential groove 528 of the ball-lock push rod 526 and to release the driven member 506, in order to move the movable contact assembly 10 to the closed circuit position.

Whenever the solenoid 534 is activated by a suitable activation signal on leads 538, which energize the solenoid coil 540, the solenoid plunger 536 drives (as shown in FIGS. 11B and 11C) the ball-lock push rod 526 into the driven member longitudinal opening 508.

The longitudinal spring tube 516 has a first end 542 and a second end 544 and houses the compression spring 520 and the ball-lock mechanism 504. The first spring end 546 engages the flange portion 530 of the ball-lock mechanism 504, which is suitably coupled to the first tube end 542. The frame 514 has an opening 548 at the second tube end 544 with the upper (with respect to FIG. 10) end portion 550 of the driven member 506 passing through such opening. Whenever the ball-lock mechanism 504 releases the driven member 506, the second spring end 552 suitably biases the driven member 506 to move the movable contact assembly 10 to the closed circuit position.

Similar to the shorting switch 2 of FIG. 1, the first VI terminal 16 is adapted for electrical connection (e.g., through a suitable conductive fastener 554) to a first power line, such as power bus 78, and the second VI terminal 22 is adapted for electrical connection to a suitable flexible shunt 556 (e.g., copper laminate). In this manner, the driven member 506 and the movable contact assembly 10 are free to move independent of a rigid second power line 558 (e.g., ground or neutral bus).

FIG. 11A shows the locked position of the ball-lock mechanism 504 with the solenoid plunger 536 stationary, the ball bearings 522,524 in the circumferential groove 510, and the separable contacts 12,18 of FIG. 10 being open. The ball-lock push rod 526 passes through an opening 560 in the flange portion 530 of the ball-lock mechanism 504 for engagement by the solenoid plunger 536 as shown in FIGS. 11B–11D.

In FIG. 11B, the solenoid coil 540 is energized, the solenoid plunger 536 is actuated to engage the ball-lock push rod 526, thereby causing the ball bearings 522,524 to slide on the shaft 562 of such push rod. At this stage, the driven member 506 has not yet been released and the separable contacts 12,18 of FIG. 10 remain open.

Next, as shown in FIG. 11C, the solenoid coil 540 remains energized, the actuated solenoid plunger 536 continues to drive the ball-lock push rod 526, thereby causing the ball bearings 522,524 to roll down into the push rod circumferential groove 522 and releasing the driven member 506, although the separable contacts 12,18 of FIG. 10 remain open. Hence, as shown by FIGS. 11B and 11C, the actuated solenoid plunger 536 strikes the push rod 526 causing the ball bearings 522,524 to enter the circumferential groove 522, thereby releasing the driven member 506 and the compression spring 520.

Finally, as shown in FIG. 11D, the compression spring 520 drives the driven member 506 to close the separable contacts 12,18 of FIG. 10.

Although the ball-lock mechanism 504 is shown in FIGS. 10 and 11A–11D, any suitable ball-lock configuration may be employed. As shown in FIG. 10, the ball-lock mechanism 504 includes a headed shank 564 having a central through-bore 566. An end of the shank 564 opposite the head has a pair of radially opposite passageways 568, which extend radially outward from the central through-bore 566. Preferably, the passageways 568 are formed with a constant diameter bore and receive a similarly sized one of the ball bearings 522,524. The ball bearings 522,524 are inserted into the corresponding passageway 568 and the outer edge of each such passageway is locally crimped. This traps the ball bearings 522,524 at their widest diameter such that the passageway 568 will still allow the radial outermost surface of the ball bearing to extend beyond the outer surface of the shank 564. Subsequently, the push rod 526 is inserted into the central through-bore 566, which traps the ball bearings 522,524 in a radially outward position such that their radial outermost feature extends beyond the radial outer surface of the shank 564.

The push rod 526 is axially retained in the position of FIG. 11A by the solenoid plunger 536. However, the radially inward extending circumferential groove 522 allows the ball bearings 522,524 to be radially inwardly displaced by axially displacing the push rod 526 with the solenoid plunger 536 as shown in FIGS. 11B and 11C in order to center the groove 522 beneath the pair of ball bearings 522,524 (FIG. 11C).

Figure 12:
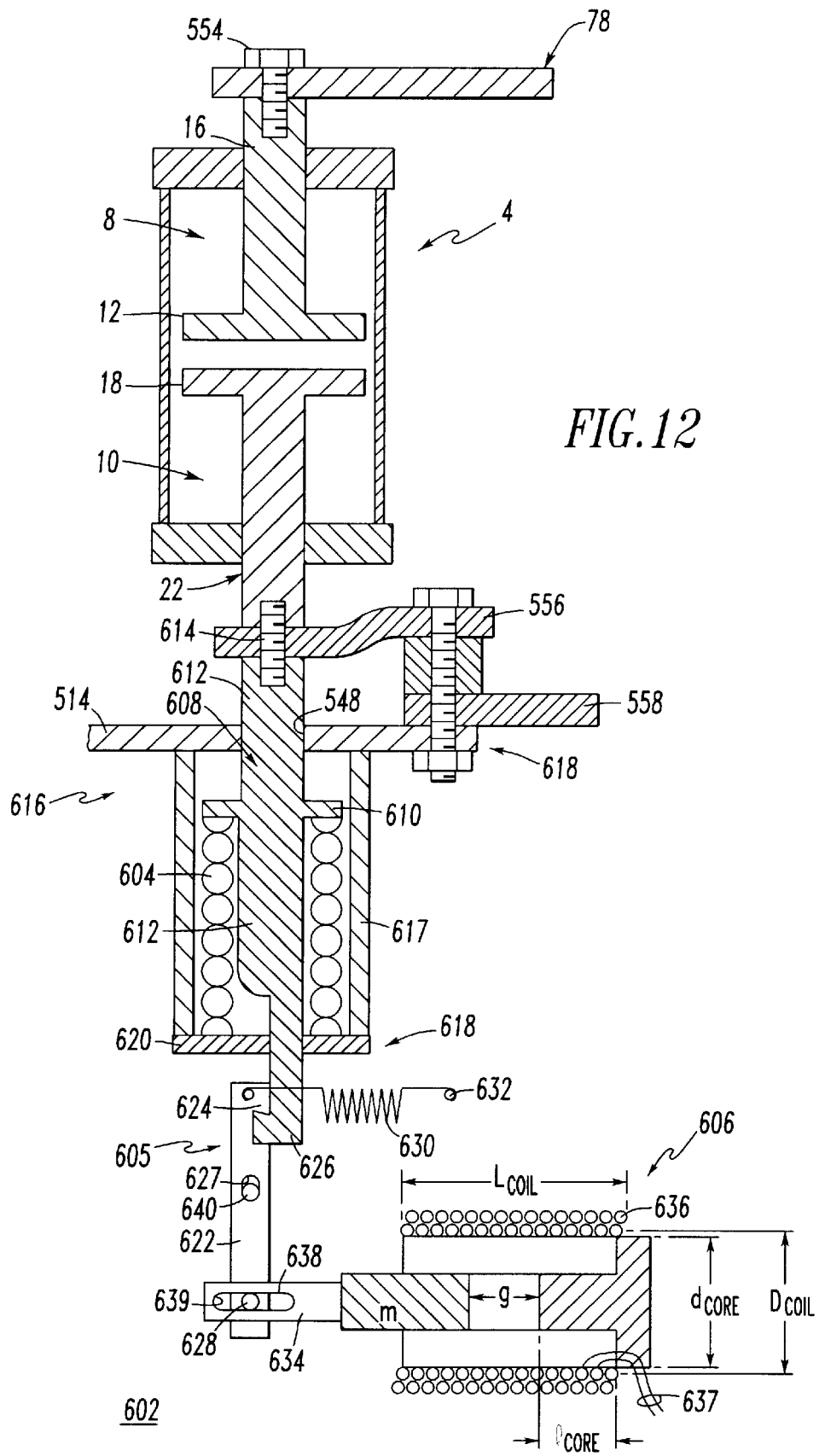
FIG. 12 is block diagram of a single phase, high-speed vacuum shorting switch employing a mechanical latch release mechanism, a solenoid, and a single vacuum interrupter (VI) in accordance with another embodiment of the present invention.

FIG. 12 shows a single phase, spring-loaded, high-speed vacuum shorting switch 602 employing the conventional vacuum interrupter (VI) 4 of FIG. 1, a spring member such as compression spring 604, a mechanical latch release mechanism 605, and an electromechanical mechanism such as solenoid 606.

A driven member 608 includes a circular flange portion 610, an upper shaft portion 612 and a coupler 614. The upper shaft portion 612 is suitably secured (e.g., by welding) to the circular flange portion 610. The coupler 614 is suitably secured (e.g., threadably connected) to both the driven member 608 and the terminal 22 of the movable contact assembly 10 to move such assembly between the open circuit position and the closed circuit position with the linear movement of the driven member 608.

A suitable mount 616, which includes the frame 514 of FIG. 10 and a spring tube 617, mounts the driven member 608 and, thus, the second terminal 22 with respect to a housing 618 for linear movement along a path substantially parallel to the longitudinal axis of the movable contact assembly 10. The compression spring 604 is disposed within the spring tube 617 with the circular flange portion 610 at one end and a surface 620 of the housing 618 at the other end. The compression spring 604 has a compressed state (as shown in FIG. 12) and a released state (not shown), which moves the driven member 608 and the movable contact assembly 10 to the closed circuit position (not shown).

The mechanical latch release mechanism 605 includes a latch member, such as lower shaft portion 622, having an upper hook portion 624, which normally latches a corresponding lower hook portion 626 of the upper shaft portion 612 of the driven member 608. This holds the compression spring 604 in the compressed state and holds the movable contact assembly 10 in the open circuit position. Otherwise, the lower shaft portion 622 releases the upper shaft portion 612 in order to release the driven member 608 to move the movable contact assembly 10 to the closed circuit position.

The lower shaft portion 622 includes a central opening 627 and a lower pin 628. A spring 630 (e.g., about three pounds) is connected between the upper hook portion 624 and a surface 632 of the housing 618 in order to bias the lower shaft portion 622 clockwise with respect to FIG. 12 and, thereby, suitably engage the corresponding hook portions 624,626. The solenoid 606 has a normally extended plunger 634 and coil 636. Whenever the solenoid 606 is activated by a suitable activation signal on leads 637, which energizes the solenoid coil 636, such solenoid retracts the plunger 634 (e.g., toward the right of FIG. 12).

The plunger 634 has an opening 638, which captures therein the pin 628 of the lower shaft portion 622. When the plunger 634 retracts, a plunger end portion 639 engages the pin 628, which rotates the lower shaft portion 622 counter-clockwise about pivot point 640 of the housing 618 against the bias of the spring 630. Upon suitable retraction of the plunger 634 and suitable corresponding counter-clockwise rotation of the lower shaft portion 622, the upper hook portion 624 of the lower shaft portion 622 unlatches the lower hook portion 626 of the upper shaft portion 612, thereby releasing the driven member 608. In turn, the compression spring 604 drives the driven member 608 upward (with respect to FIG. 12) in order to close the separable contacts 12,18 of the shorting switch 602. Similar to the shorting switch 502 of FIG. 10, the first terminal 16 is adapted for electrical connection to a power line, such as 78, and the second terminal 22 is adapted for electrical connection to a flexible conductor, such as 556.

Figure 13:
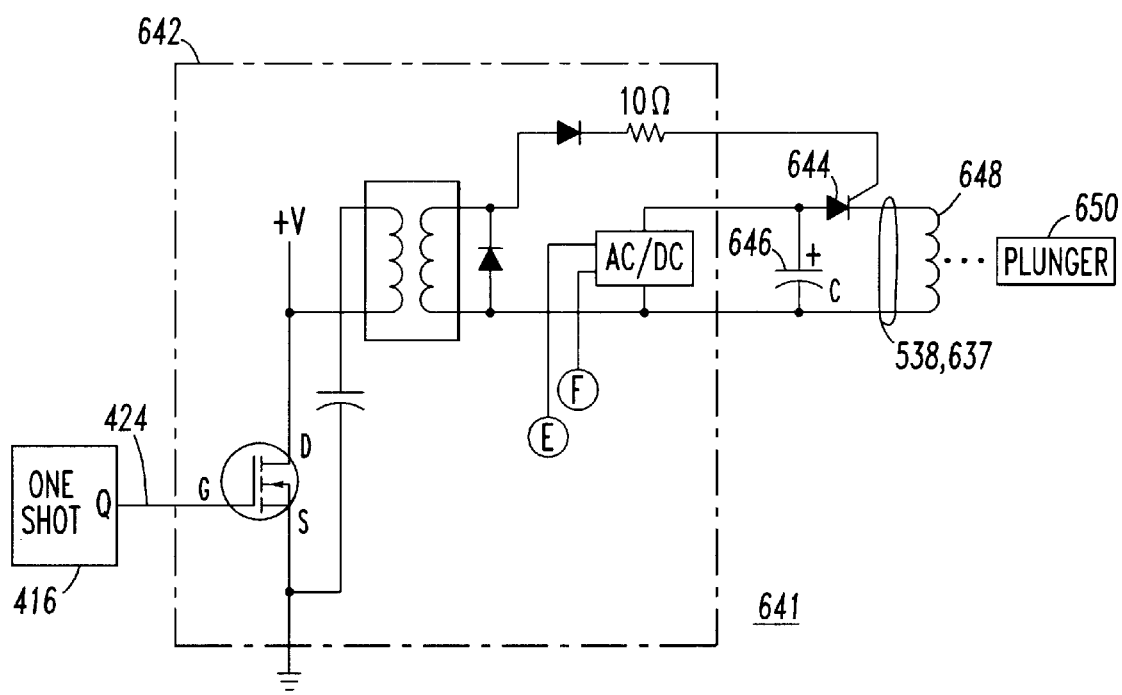
FIG. 13 is a schematic diagram of a circuit for driving the solenoids of FIGS. 10 and 12.

The shorting switch 502 of FIG. 10 and the shorting switch 602 of FIG. 12 are operable with a detection and activation circuit, which is similar to the circuit 146 of FIGS. 6, 8 and 9A–9B. That circuit 146 includes the detection (OD) circuit 148 of FIG. 8, which detects the arcing fault 142 and responsively outputs one or more trigger signals 150, and the activation circuit (ACT) 152 of FIGS. 9A–9C, which detects the one or more trigger signals 150 and responsively outputs the activation signal 154. The difference, however, is that the shorting switches 502,602 employs the respective solenoids 534,606, rather than the charges 60. FIG. 13 shows a suitable circuit 641 for driving either of the solenoids 534,606 from the output 424 of the one-shot multivibrator 416 of FIG. 9A.

After the circuit 148 detects the arcing fault 142 and responsively outputs the trigger signal 150, the multivibrator output 424 provides a pulse of suitable duration (e.g., about 1.2 $\mu$s). In turn, the circuit 642 triggers a thyristor 644, which causes a capacitor (C) 646 to dump current into the solenoid coil 648 (e.g., coil 540 of FIG. 10 or coil 636 of FIG. 12).

Table 2 shows the results of a solenoid circuit analysis to determine the current needed to move the solenoid plunger 650 in less than about 1 ms. These assume that the plunger mass, m, is 0.016 kg; that the length of the core, $l_{CORE}$, is 1.3 cm; and that the diameter of the core, $d_{CORE}$, is 2.64 cm. Although exemplary values are shown, a wide range of values and/or other suitable electro-mechanical mechanisms may be employed.

TABLE 2

| SYMBOL | VALUE | UNITS | DESCRIPTION |
|---|---|---|---|
| $V_o$ | 300 | V | Initial Voltage of Capacitor C |
| C | 3300 | $\mu$F | Capacitance of Capacitor C |
| R | 31 | M$\Omega$ | Resistance of Coil 648 |
| Lc | 3.9 | $\mu$H | Inductance of Coil 648 |
| Lstray | 2 | $\mu$H | Stray circuit inductance |
| $\Delta$t | 0.000006 | s | Time increment for circuit analysis |
| $\tau$ | 0.0002 | s | Time constant (L/R) |
| $\omega$ | 6645.06 | rad/s | Frequency |
| C1 | 7590.37 | A | Coefficient = $V_o/\omega L$ |
| N | 20 | # | Turns of Coil 648 |
| $D_{COIL}$ | 2 | cm | Diameter of Coil 648 |
| $L_{COIL}$ | 4 | cm | Length of Coil 648 |
| $\mu r$ | 1 | # | Permeability of Coil 648 |

The value of L in Table 2 is defined by Lc+Lstray.

Figure 14A:
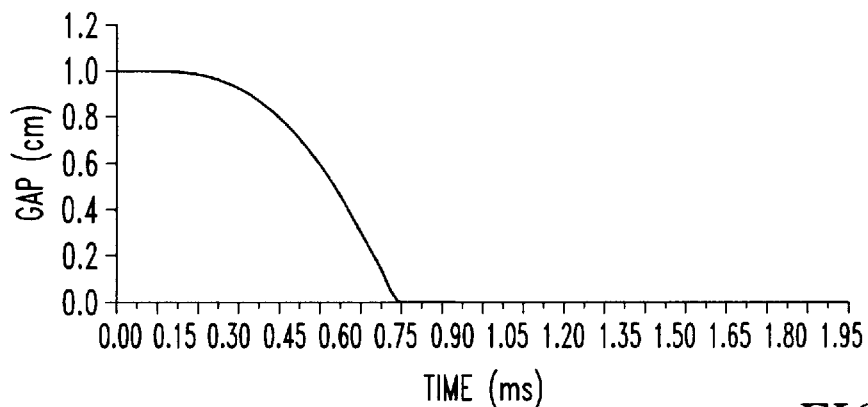
FIGS. 14A–14C are plots of solenoid gap, plunger force and solenoid coil current for analyzing the motion of the solenoid of FIG. 12.
Figure 14B:
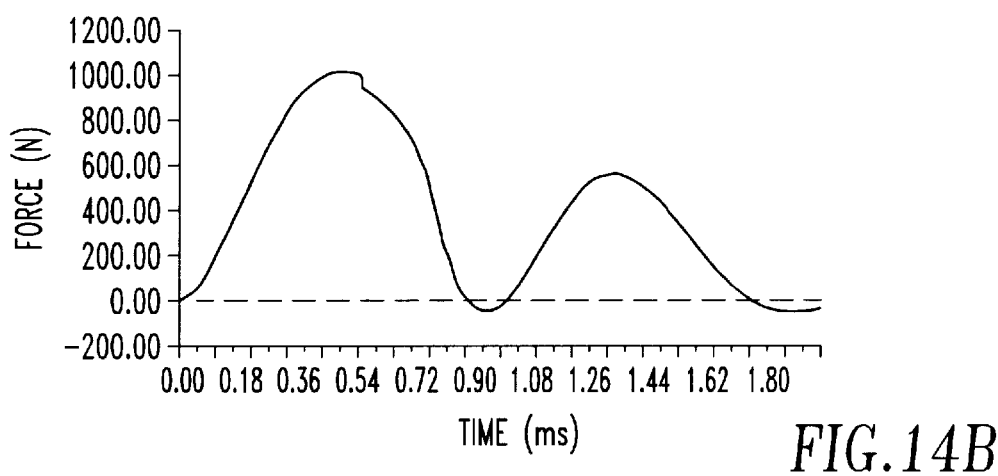
Figure 14C:
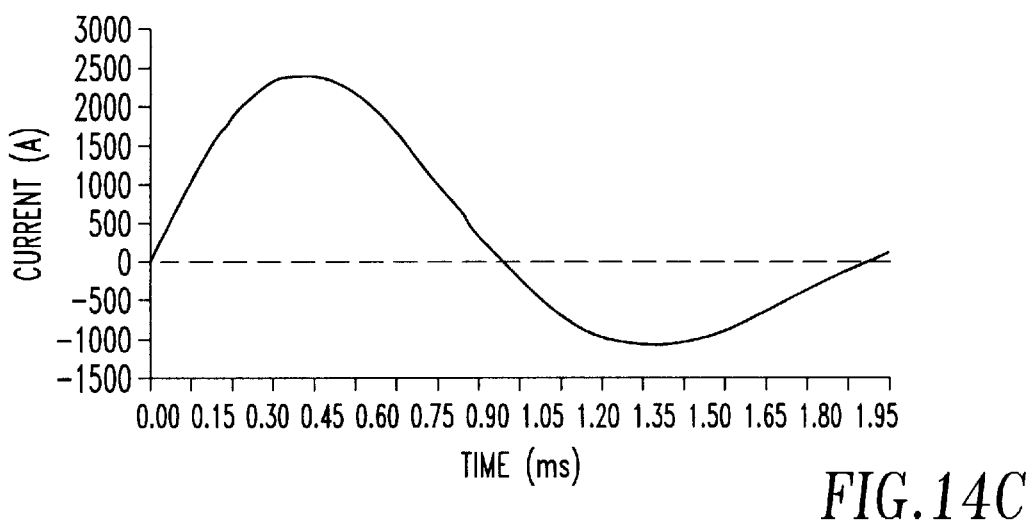

FIGS. 14A–14C show plots of the solenoid gap (g), force of the plunger 650, and current of the coil 648, respectively, for analyzing the motion of the solenoids 534,606.

The exemplary shorting switches 2,101,502,602 employ relatively simple and low cost approaches in providing an energy storage and release mechanism. The compression springs 40,520,604 provide a suitable closing and holding force on the vacuum interrupter (VI) 4 or a modified VI (e.g., no shield; no contacts or modified contacts) (not shown) for use with medium voltage power distribution equipment, such as switchgear.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A shorting switch for eliminating arcing faults in power distribution equipment, said shorting switch comprising:

a vacuum switch comprising a vacuum envelope containing a fixed contact assembly and a movable contact assembly movable along a longitudinal axis between a closed circuit position in electrical contact with the fixed contact assembly and an open circuit position spaced apart from the fixed contact assembly;

a driven member;

a mount mounting the driven member for linear movement along a path substantially parallel to the longitudinal axis of the movable contact assembly, said driven member coupled to the movable contact assembly to move the movable contact assembly between the open circuit position and the closed circuit position with the linear movement of the driven member;

a spring member having a compressed state and a released state, which moves said driven member and the movable contact assembly to the closed circuit position;

a release member having an opening therein, said release member coupled to said driven member and normally maintaining said spring member in the compressed state;

a charge disposed in the opening of said release member, said charge being actuated to fracture said release member and release said spring member to the released state; and first and second terminals respectively electrically interconnected with said fixed contact assembly and said movable contact assembly.

2. The shorting switch of claim 1 wherein said vacuum envelope is a sealed vacuum chamber; wherein said fixed contact assembly comprises a fixed contact sealed within the sealed vacuum chamber and an electrical conductor connected to the fixed contact at one end thereof, said electrical conductor sealably penetrating the sealed vacuum chamber and terminating at said first terminal at the other end of said fixed contact; wherein said movable contact assembly comprises a moveable contact sealed within the sealed vacuum chamber and moveable between a first position, out of electrical communication with the fixed contact, and a second position, in electrical communication with the fixed contact, said movable contact assembly further comprises a movable electrical stem connected to the moveable contact at one end thereof, said movable electrical stem sealably penetrating the sealed vacuum chamber and terminating at said second terminal at the other end of said moveable contact; and wherein said driven member is coupled to the movable electrical stem.

3. The shorting switch as recited in claim 1 wherein said spring member is a compression spring having a first end and a second end; wherein said release member is a release bolt having a first end and a second end; and wherein said mount comprises a bushing having a longitudinal opening and further comprises a longitudinal tube having a closed end and an open end, said longitudinal tube housing said compression spring, said release bolt and said charge, the first end of said compression spring engaging the closed end of said longitudinal tube, the first end of said release bolt coupled to the closed end of said longitudinal tube, the first end of said driven member coupled to the second end of said release bolt, said bushing resting in the open end of said longitudinal tube, said driven member resting in the longitudinal opening of said bushing, the second end of said compression spring biasing said driven member to move the movable contact assembly to the closed circuit position after actuation of said charge.

4. The shorting switch as recited in claim 1 wherein said charge is an electrically activated, chemical charge.

5. The shorting switch as recited in claim 1 wherein said first and second terminals are adapted for electrical connection to first and second power lines, respectively.

6. The shorting switch as recited in claim 1 wherein said first terminal is adapted for electrical connection to a power line; and wherein said second terminal is adapted for electrical connection to a flexible conductor.

7. The shorting switch as recited in claim 1 wherein said first and second terminals are adapted for electrical connection to a power line and a neutral or ground.

8. The shorting switch as recited in claim 1 wherein said release member has a longitudinal axis; and wherein the opening of said release member is a longitudinal cavity along said longitudinal axis of said release member.

9. The shorting switch as recited in claim 8 wherein said charge is activated to provide a shock wave to fracture said release member; and wherein said release member is a release bolt having a body and a breakline disposed thereon to locate and control fracture of said release bolt responsive to said shock wave.

10. The shorting switch as recited in claim 9 wherein the breakline has a predetermined depth in the body of said release bolt; and wherein said spring member has a predetermined compression force, with said release bolt being structured to maintain at least said compression force until after said charge is activated.

11. A shorting system for eliminating arcing faults in power distribution equipment, said shorting system comprising:
  a vacuum switch comprising a vacuum envelope containing a fixed contact assembly and a movable contact assembly movable along a longitudinal axis between a closed circuit position in electrical contact with the fixed contact assembly and an open circuit position spaced apart from the fixed contact assembly;
  a driven member;
  a mount mounting the driven member for linear movement along a path substantially parallel to the longitudinal axis of the movable contact assembly, said driven member coupled to the movable contact assembly to move the movable contact assembly between the open circuit position and the closed circuit position with the linear movement of the driven member;
  a spring member having a compressed state and a released state, which moves said driven member and the movable contact assembly to the closed circuit position;
  a release member having an opening therein, said release member coupled to said driven member and normally maintaining said spring member in the compressed state;
  a charge disposed in the opening of said release member, said charge being actuated to fracture said release member and release said spring member to the released state;
  first and second terminals respectively electrically interconnected with said fixed contact assembly and said movable contact assembly; and
  means for detecting an arcing fault and responsively activating the charge disposed in the opening of said release member,
  wherein said activated charge fractures said release member, which releases said spring member, which drives said driven member to move the movable contact assembly to the closed circuit position to eliminate said arcing fault.

12. The shorting system as recited in claim 11 wherein said charge includes an electrical input; and wherein said means for detecting an arcing fault and responsively activating the charge comprises means for detecting the arcing fault and responsively outputting a trigger signal, and means for detecting the trigger signal and responsively outputting an activation signal to the electrical input of said charge.

13. The shorting system as recited in claim 12 said charge is an electrically activated, chemical charge.

14. The shorting system as recited in claim 11 wherein said vacuum switch is adapted for operation with medium voltage power distribution equipment.

15. The shorting system as recited in claim 11 wherein said means for detecting an arcing fault and responsively activating the charge has an activation delay of about 550 $\mu$s after initiation of an arcing fault event.

16. The shorting system as recited in claim 12 wherein said means for detecting the arcing fault and responsively outputting a trigger signal comprises at least one photovoltaic sensor adapted to detect the arcing fault and output an optical signal as said trigger signal.

17. The shorting system as recited in claim 16 wherein said arcing fault includes arc light; and wherein said at least one photovoltaic sensor is a photovoltaic sensor, which is self-powered from the arc light, said photovoltaic sensor having an output with said trigger signal, which is responsive to said arc light.

18. The shorting system as recited in claim 12 wherein said means for detecting the arcing fault and responsively outputting a trigger signal comprises a plurality of photovoltaic sensors adapted to detect the arcing fault and output a plurality of first optical signals on a plurality of outputs, an optical multiplexer having a plurality of inputs and an output, a plurality of fiber optic cables connected between the outputs of said photovoltaic sensors and the inputs of said optical multiplexer, the output of said optical multiplexer outputting a second optical signal as said trigger signal.

19. The shorting system as recited in claim 12 wherein said means for detecting the trigger signal and responsively outputting an activation signal to the electrical input of said charge comprises means for generating a charge voltage, a spark gap adapted to electrically connect the charge voltage to the electrical input of said charge, said spark gap having a control input, and means for detecting the trigger signal and responsively outputting a control signal to the control input of said spark gap, said spark gap outputting the activation signal to the electrical input of said charge responsive to said control signal.

20. The shorting system as recited in claim 19 wherein said means for detecting the trigger signal and responsively outputting a control signal comprises means for detecting the trigger signal, and means for outputting the control signal responsive to the detected trigger signal.

21. The shorting system as recited in claim 20 wherein said means for detecting the trigger signal and responsively outputting a control signal further comprises means for tripping an upstream circuit breaker for said power distribution equipment responsive to the detected trigger signal.

22. The shorting system as recited in claim 12 wherein said charge includes an electrical input; and wherein said means for detecting an arcing fault and responsively activating the charge comprises means for detecting the arcing fault and responsively outputting a plurality of trigger signals, and means for detecting the trigger signals and responsively outputting an activation signal to the electrical input of said charge.

23. A shorting switch for eliminating arcing faults in power distribution equipment, said shorting switch comprising:
  a vacuum switch comprising a vacuum envelope containing a fixed contact assembly and a movable contact assembly movable along a longitudinal axis between a closed circuit position in electrical contact with the fixed contact assembly and an open circuit position spaced apart from the fixed contact assembly;
  a driven member having a longitudinal opening with a circumferential groove therein;
  a mount mounting the driven member for linear movement along a path substantially parallel to the longitudinal axis of the movable contact assembly, said driven member coupled to the movable contact assembly to move the movable contact assembly between the open circuit position and the closed circuit position with the linear movement of the driven member;

a spring member having a compressed state and a released state, which moves said driven member and the movable contact assembly to the closed circuit position;

a ball-lock member having a plurality of ball bearings and a push rod with a circumferential groove therein, said ball bearings engaging the circumferential groove of the longitudinal opening of the driven member to hold said spring member in the compressed state and to hold said movable contact assembly in the open circuit position;

means for driving the push rod of said ball-lock member into the longitudinal opening of said driven member to cause said ball bearings to engage the circumferential groove of the push rod of said ball-lock member and to release said driven member, in order to move the movable contact assembly to the closed circuit position; and first and second terminals respectively electrically connected to said fixed contact assembly and said movable contact assembly.

24. The shorting switch of claim 23 wherein said means for driving the push rod is a solenoid having a plunger, which drives the push rod of said ball-lock member into the longitudinal opening of said driven member when said solenoid is actuated.

25. The shorting switch of claim 23 wherein said spring member is a compression spring having a first end and a second end; wherein said ball-lock member has a first end and a second end; wherein said driven member has a first end with said longitudinal opening and a second end; and wherein said mount comprises a longitudinal tube having a first end and an open second end, said longitudinal tube housing said compression spring and said ball-lock member, the first end of said compression spring engaging the first end of said longitudinal tube, the first end of said ball-lock member coupled to the first end of said longitudinal tube, the second end of said driven member coupled to said movable contact assembly, the first end of said driven member passing through the open second end of said longitudinal tube, the second end of said compression spring biasing said driven member to move the movable contact assembly to the closed circuit position.

26. The shorting switch of claim 25 wherein the push rod of said ball-lock member passes through the first end of said longitudinal tube; and wherein said means for driving the push rod is a solenoid having a plunger, which drives the push rod of said ball-lock member into the longitudinal opening of said driven member when said solenoid is actuated.

27. The shorting switch as recited in claim 23 wherein said first terminal is adapted for electrical connection to a power line; and wherein said second terminal is adapted for electrical connection to a flexible conductor.

28. A shorting system for eliminating arcing faults in power distribution equipment, said shorting system comprising:

a housing;

a vacuum switch comprising a vacuum envelope containing a fixed contact assembly and a movable contact assembly movable along a longitudinal axis between a closed circuit position in electrical contact with the fixed contact assembly and an open circuit position spaced apart from the fixed contact assembly;

a driven member;

a mount mounting the driven member in said housing for linear movement along a path substantially parallel to the longitudinal axis of the movable contact assembly, said driven member coupled to the movable contact assembly to move the movable contact assembly between the open circuit position and the closed circuit position with the linear movement of the driven member;

a spring member having a compressed state and a released state, which moves said driven member and the movable contact assembly to the closed circuit position;

a latch member, which normally latches said driven member to hold said spring member in the compressed state and to hold said movable contact assembly in the open circuit position, said latch member releasing said driven member to move the movable contact assembly to the closed circuit position, said latch member having an end, which engages said driven member, and a pivot in said housing;

means for detecting an arcing fault and responsively unlatching the end of said latch member to release said driven member to move the movable contact assembly to the closed circuit position; and first and second terminals respectively electrically interconnected with said fixed contact assembly and said movable contact assembly.

29. The shorting system of claim 28 wherein the end of said latch member is a first end; wherein said latch member also has a second end; and wherein said means for detecting an arcing fault and responsively unlatching said latch member to release said driven member comprises a solenoid having a plunger, which moves the second end of said latch member to pivot said latch member about said pivot and to cause the first end of said latch member to release said driven member.

30. The shorting system as recited in claim 28 wherein said first terminal is adapted for electrical connection to a power line; and wherein said second terminal is adapted for electrical connection to a flexible conductor.

* * * * *